(12) United States Patent
Kogure et al.

(10) Patent No.: US 7,856,481 B2
(45) Date of Patent: Dec. 21, 2010

(54) DATA COMMUNICATION APPARATUS AND ELECTRONIC MAIL DATA PRODUCING METHOD

(75) Inventors: Shinya Kogure, Ibaraki (JP); Yutaka Inoue, Tokyo (JP); Michihiro Izumi, Chiba (JP); Yosuke Ezumi, Ibaraki (JP); Akihiro Yoshitani, Ibaraki (JP)

(73) Assignee: Canon Kabushiki Kaisha (JP)

( * ) Notice: Subject to any disclaimer, the term of this patent is extended or adjusted under 35 U.S.C. 154(b) by 930 days.

(21) Appl. No.: 11/681,942

(22) Filed: Mar. 5, 2007

(65) Prior Publication Data

US 2007/0162551 A1 Jul. 12, 2007

Related U.S. Application Data

(63) Continuation of application No. 10/021,890, filed on Oct. 31, 2001, now Pat. No. 7,206,812.

(30) Foreign Application Priority Data

Oct. 31, 2000 (JP) .............................. 2000-333492

(51) Int. Cl.
*G06F 15/16* (2006.01)
(52) U.S. Cl. ..................................... 709/211
(58) Field of Classification Search ................. 709/200, 709/211; 711/115
See application file for complete search history.

(56) References Cited

U.S. PATENT DOCUMENTS

| | | | |
|---|---|---|---|
| 5,563,655 A * | 10/1996 | Lathrop .................... | 348/231.9 |
| 5,978,833 A * | 11/1999 | Pashley et al. .............. | 709/200 |
| 6,100,877 A * | 8/2000 | Chery et al. ................ | 345/178 |
| 6,101,526 A | 8/2000 | Mochizuki | |
| 6,172,763 B1 | 1/2001 | Toyoda et al. | |
| 6,226,630 B1 | 5/2001 | Billmers | |
| 6,445,654 B1 * | 9/2002 | Hayakawa et al. ........ | 369/47.23 |
| 6,449,052 B1 * | 9/2002 | Sherer et al. ............... | 358/1.13 |
| 6,480,884 B1 | 11/2002 | Saito | |
| 6,493,107 B1 | 12/2002 | Toyoda et al. | |
| 6,542,936 B1 | 4/2003 | Mayle et al. | |
| 6,683,700 B1 | 1/2004 | Shiota et al. | |
| 6,725,228 B1 | 4/2004 | Clark et al. | |
| 6,804,700 B1 | 10/2004 | Terek et al. | |
| 6,931,432 B1 | 8/2005 | Yoshida | |

(Continued)

*Primary Examiner*—Douglas B Blair
(74) *Attorney, Agent, or Firm*—Rossi, Kimms & McDowell LLP

(57) ABSTRACT

A data communication apparatus and an electronic mail data producing method are provided that are capable of allowing a file name to be easily added to a file attached to an electronic mail and also allowing a file name to be added to a file attached to an electronic mail, which is commensurate with the contents of the date to be transmitted. A CPU of the data communication apparatus combines a page number allotted to each of the images converted into files with the subject of the electronic mail that is inputted, to generate an attached image file name, and transmits the electronic mail with the image data in the form of files attached thereto together with the generated attached image file names. Therefore, it is not necessary to input the name of an image file attached to an electronic mail, which facilitates the operation of transmitting an electronic mail and enables giving a file name that enables the receiver of the electronic mail to easily recognize the contents of the attached image file.

4 Claims, 13 Drawing Sheets

U.S. PATENT DOCUMENTS

| | | | |
|---|---|---|---|
| 6,947,533 B2 * | 9/2005 | Okamura et al. | 379/142.06 |
| 6,990,315 B2 * | 1/2006 | Izumi | 455/41.1 |
| 7,016,076 B2 | 3/2006 | Izumi | |
| 7,054,908 B2 * | 5/2006 | Kogure et al. | 709/206 |
| 7,130,066 B1 | 10/2006 | Kanematu | |
| 7,173,726 B2 * | 2/2007 | Izumi | 358/1.15 |
| 7,206,812 B2 * | 4/2007 | Kogure et al. | 709/206 |
| 7,280,641 B2 * | 10/2007 | Kogure | 379/88.14 |
| 7,542,066 B2 * | 6/2009 | Ezumi et al. | 348/14.01 |
| 7,721,017 B2 * | 5/2010 | Estakhri et al. | 710/15 |
| 7,756,106 B2 * | 7/2010 | Nakao et al. | 370/352 |

\* cited by examiner

DATA COMMUNICATION APPARATUS AND ELECTRONIC MAIL DATA PRODUCING METHOD

This is a continuation application of U.S. patent application Ser. No. 10/021,890 filed Oct. 31, 2001.

BACKGROUND OF THE INVENTION

1. Field of the Invention

This invention relates to a data communication apparatus having an electronic mail transmission function, an electronic mail data producing method, and a program for implementing the method.

2. Description of the Related Art

In recent years, methods have been proposed in which a facsimile apparatus transmits image data obtained by reading an original by a scanner, as an attached file by electronic mail to the Internet. For example, image data obtained by reading an image on an original by a scanner of a facsimile apparatus is transmitted in a TIFF (Tag Image File Format) by electronic mail.

A description will be given of a method of transmitting an electronic mail by a conventional facsimile apparatus.

First, a user sets originals to be transmitted in a reader of the facsimile apparatus, and selects a destination and instructs the facsimile apparatus to start the transmission.

The facsimile apparatus reads the originals set in the reading section on a sheet-by-sheet basis to code the read images in the MMR (Modified Modified READ) method, and then converts the coded data into TIFF files. In this TIFF conversion, TIFFClassF header information is added to the top of image data in a G3 format to generate TIFF image data. The TIFF image data, which is binary data, is converted into text data. An electronic mail header is then added to the TIFF image data that is to be converted into the text data At this time, as the name of the subject of the electronic mail and the file name of a file attached thereto, a predetermined fixed name is added or a desired name is manually input by the user. Upon completion of data in an electronic mail format in this manner, the electronic mail is transmitted by SMTP (Simple Mail Transfer Protocol).

In the conventional facsimile apparatus, however, as the file name of a file attached to an electronic mail, a predetermined fixed ones are added or a desired name is manually input by the user. This gives rise to the problem that if the predetermined fixed name is added, the content of the added name cannot be determined at the destination that receives the electronic mail, and if the desired name is manually input, the operation of manually inputting the name is complicated.

SUMMARY OF THE INVENTION

It is therefore an object of the present invention to provide a data communication apparatus and an electronic mail data producing method that solve the above described program and a program for implementing the method.

It is another object of the present invention to provide a data communication apparatus and an electronic mail data producing method that are capable of allowing a file name to be easily added to a file attached to an electronic mail, and a program for implementing the method.

It is yet another object of the present invention to provide a data communication apparatus and an electronic mail data producing method that are capable of allowing a file name to be added to a file attached to an electronic mail, which is commensurate with the contents of the date to be transmitted, and a program for implementing the method.

To attain the above objects, the present invention provides a data communication apparatus comprising an inputter arranged to input file data, a setter arranged to set a subject of an electronic mail to be transmitted, a producer arranged to produce a file name of the file data input by the inputter based on the subject set by the setter, and a transmitter arranged to transmit electronic mail data including the file data input by the inputter, the subject set by the setter, and the file name produced by the producer.

Preferably, the inputter inputs the file data obtained by reading an image on an original.

Alternatively, the inputter inputs the file data obtained from a detachable memory.

In a preferred form of the present invention, the producer produces the file name based on a number of the file data input by the inputter and the subject set by the setter.

More preferably, the producer produces the file name in accordance with a kind of the file data input by the inputter.

To attain the above objects, the present invention also provides a method of producing electronic mail data to be transmitted, comprising the steps of inputting file data, setting a subject of an electronic mail to be transmitted, and producing a file name of the file data input in the inputting step based on the subject set in the setting step.

To attain the above objects, the present invention further provides a computer readable program stored in a storage medium, comprising an inputting module for inputting file data, a setting moduel for setting a subject of an electronic mail to be transmitted, and a producing module for producing a file name of the file data input by the inputting module based on the subject set by the setting module.

The above and other objects, features and advantages of the present invention will be more apparent from the following detailed description taken in conjunction with the accompanying drawings.

DETAILED DESCRIPTION OF THE PREFERRED EMBODIMENTS

The present invention will now be described in detail with reference to the drawings showing embodiments thereof.

First Embodiment

Figure 1:
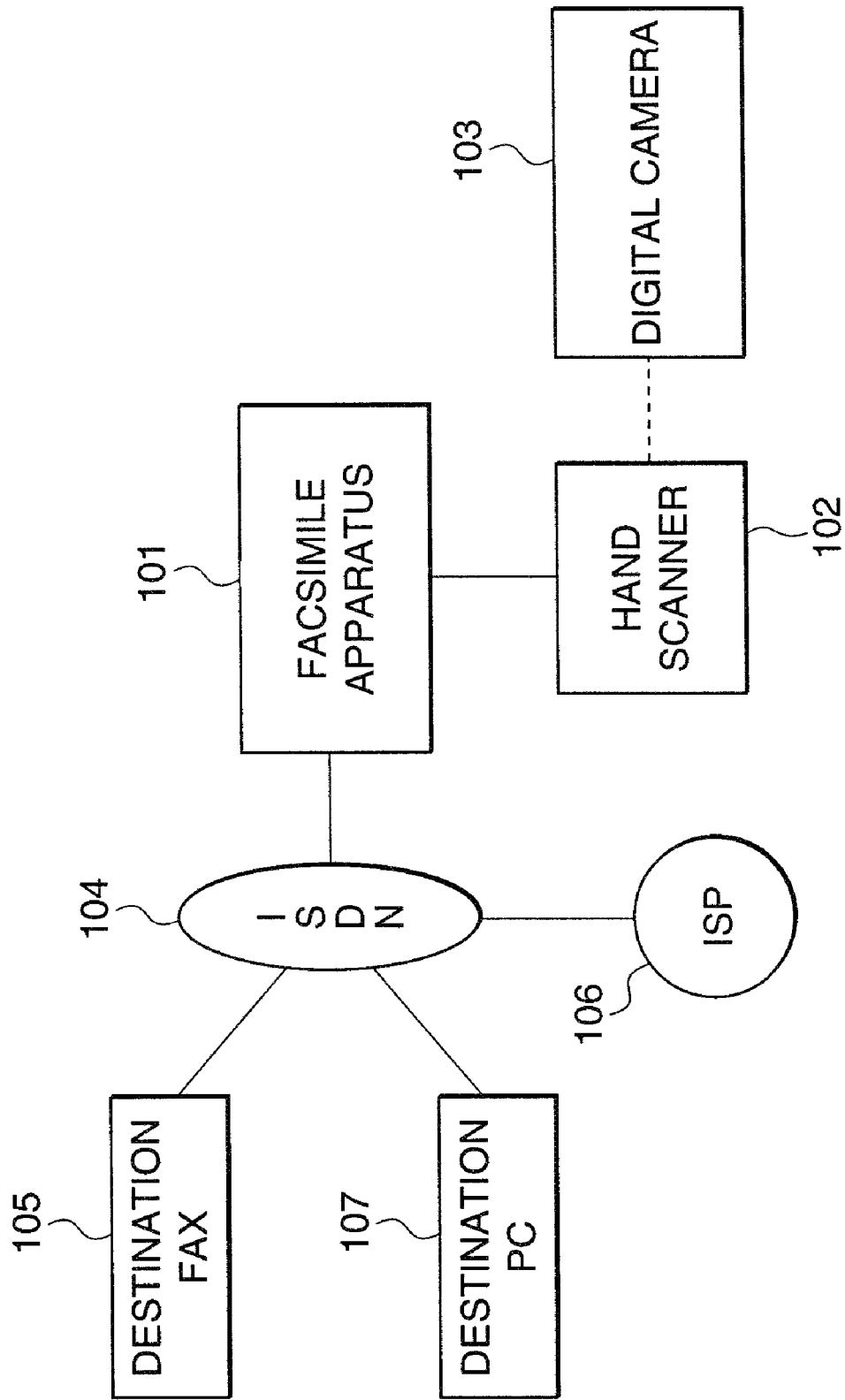
FIG. 1 is a block diagram showing the arrangement of a communication system incorporating a data communication apparatus according to each of first and second embodiments of the present invention.

FIG. 1 is a schematic block diagram showing the arrangement of a communication system incorporating a data communication apparatus according to a first embodiment of the present invention. This communication system is comprised of a facsimile apparatus 101, a hand scanner 102, a digital camera 103, a communication network such as ISDN (Integrated Services Digital Network), a facsimile apparatus (FAX) 105 at a destination, an internet service provider (ISP) 106, and a computer (PC) 107 at a destination.

The arrangement of the communication system will now be described in detail. The facsimile apparatus 101, the destination facsimile apparatus 105 and the destination computer 107 communicate with one another through the communication network 104. The facsimile apparatus 101 is capable of mounting thereon the detachable hand scanner 102, and is intended to read various kinds of images. The digital camera 103 is capable of mounting thereon a detachable storage medium storing image data captured by the digital camera 103. It is assumed that image data is exchanged between the hand scanner 102 and the digital camera 103 via a storage medium such as a compact flash (CF) card and a smart medium. The internet service provider (ISP) 106 provides a service for connection to the Internet.

Figure 2A:
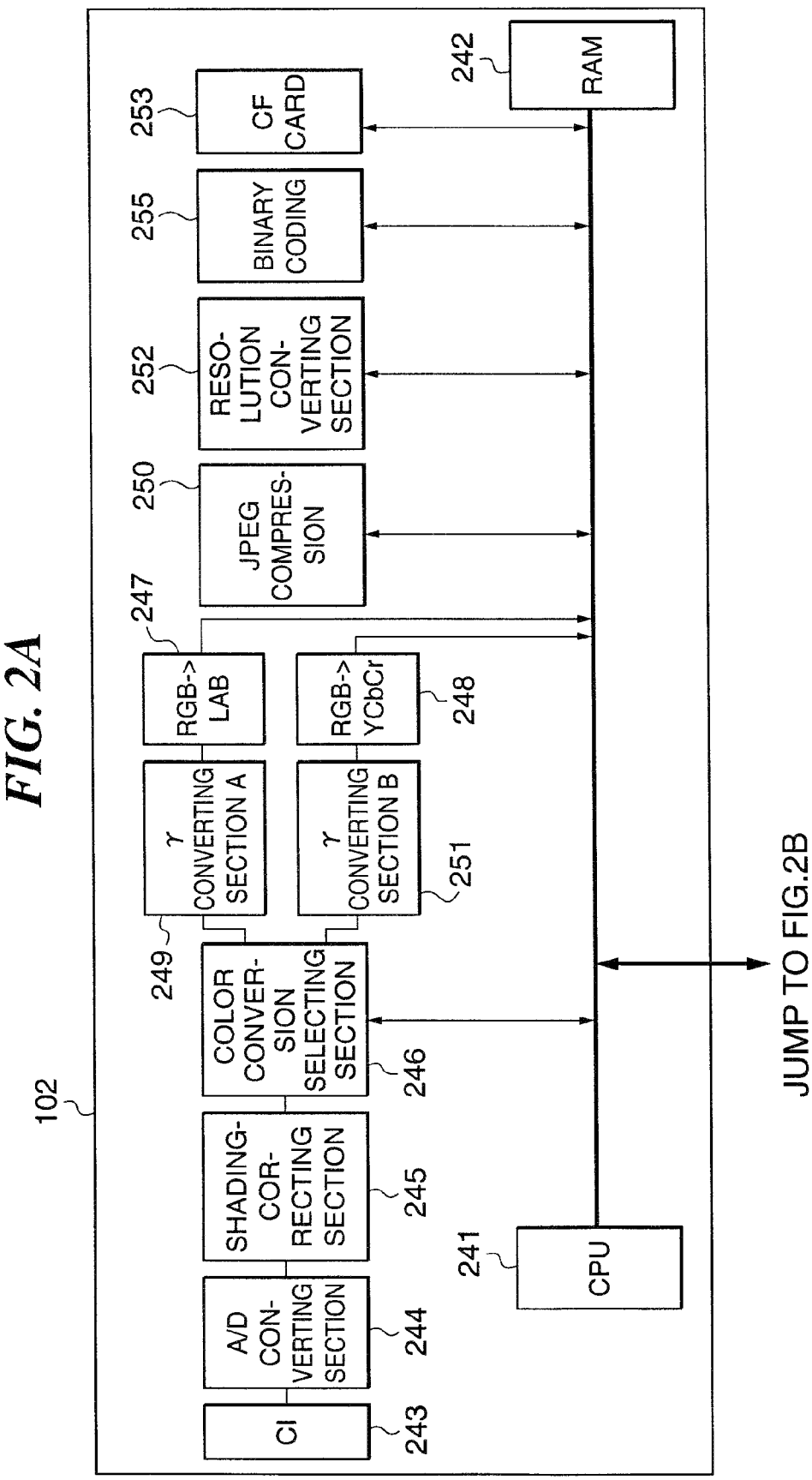
FIGS. 2A and 2B is a block diagram showing the arrangement of a facsimile apparatus as the data communication apparatus according to the first or second embodiment of the present invention and a hand scanner.
Figure 2B:
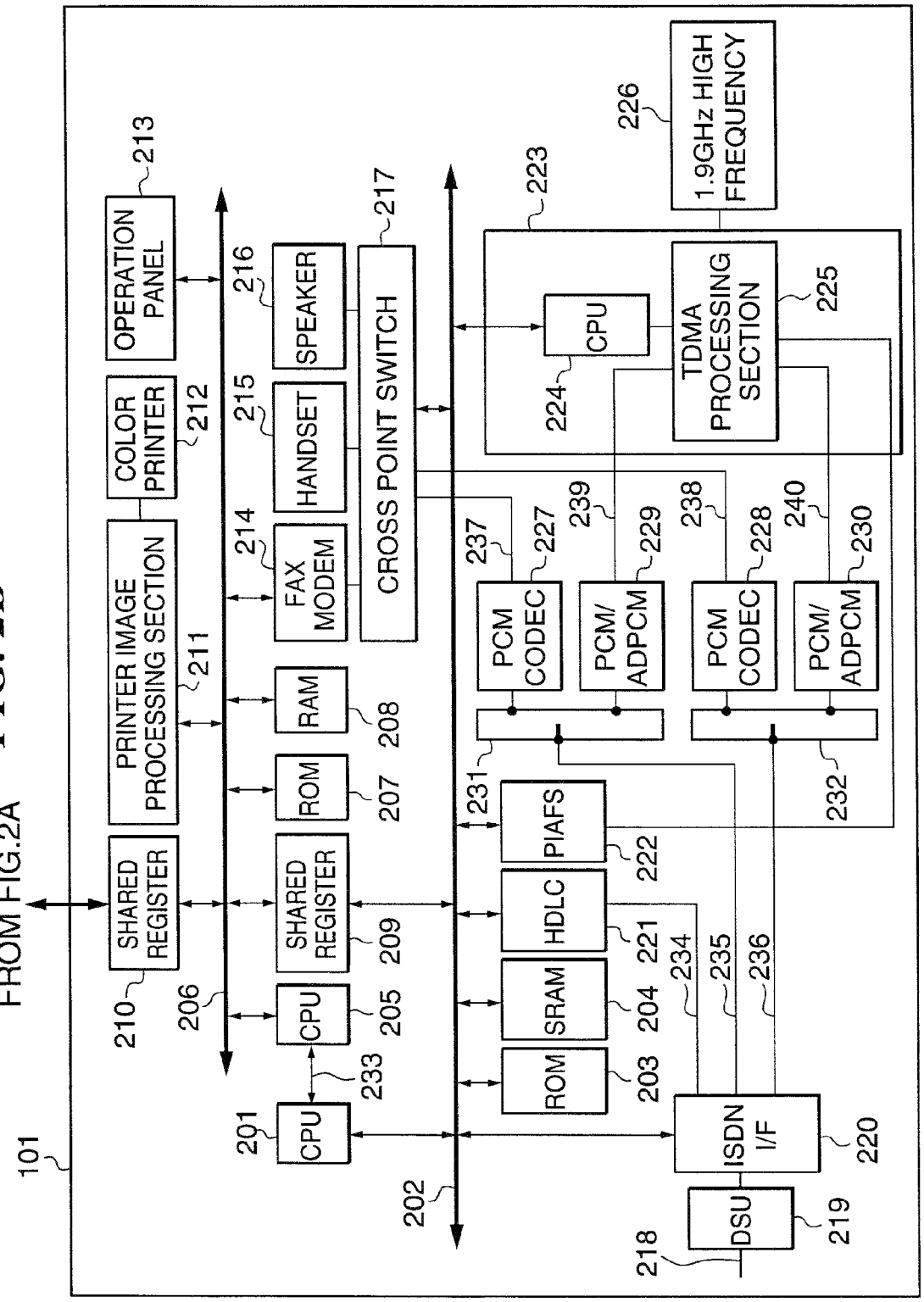
Figure 3:
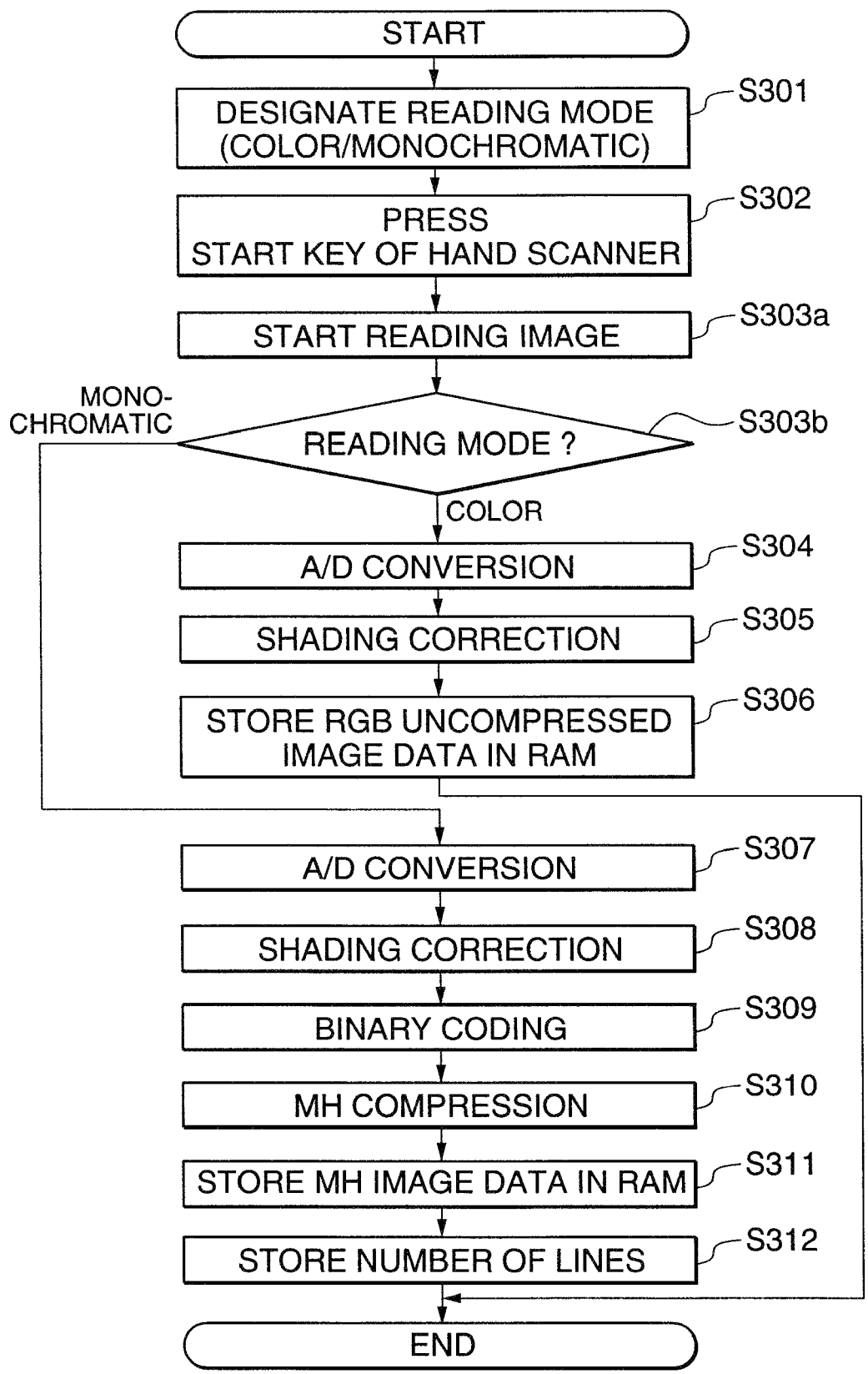
FIG. 3 is a flow chart showing a process carried out in reading with the hand scanner according to the first embodiment of the present invention.
Figure 4A:
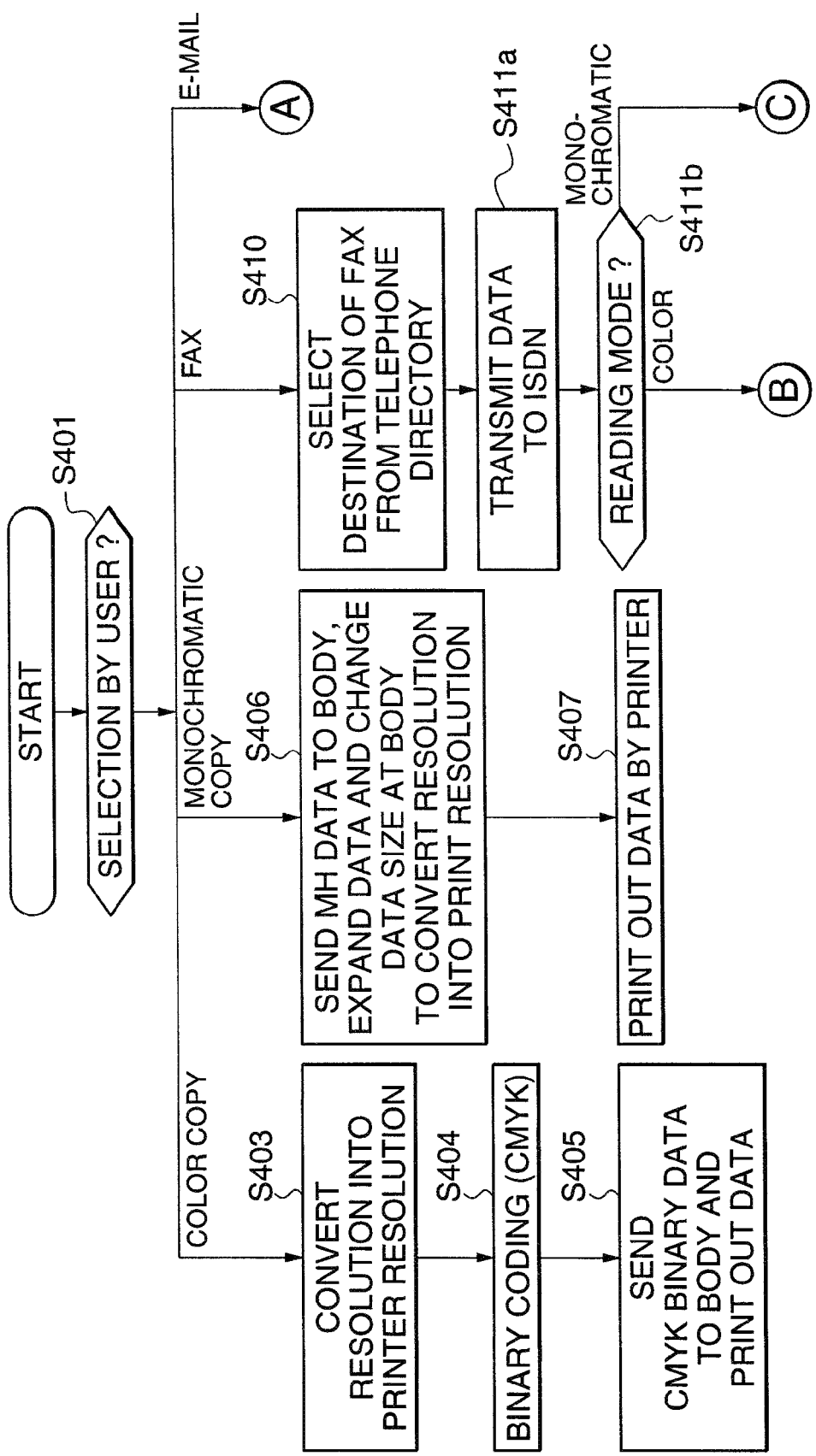
FIGS. 4A and 4B is a flow chart showing a process carried out in a state wherein the hand scanner is mounted according to the first embodiment of the present invention.
Figure 4B:
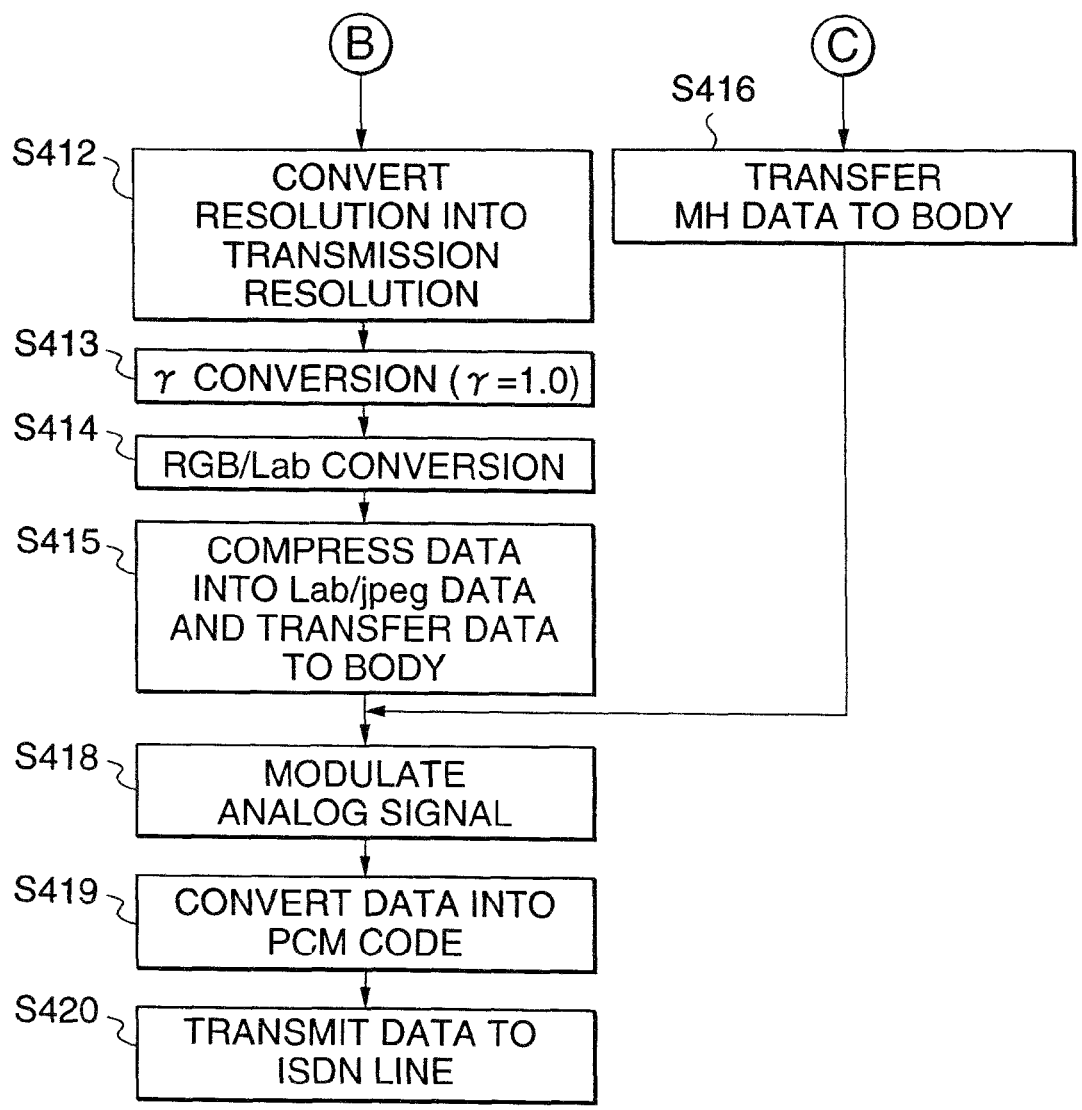
Figure 5:
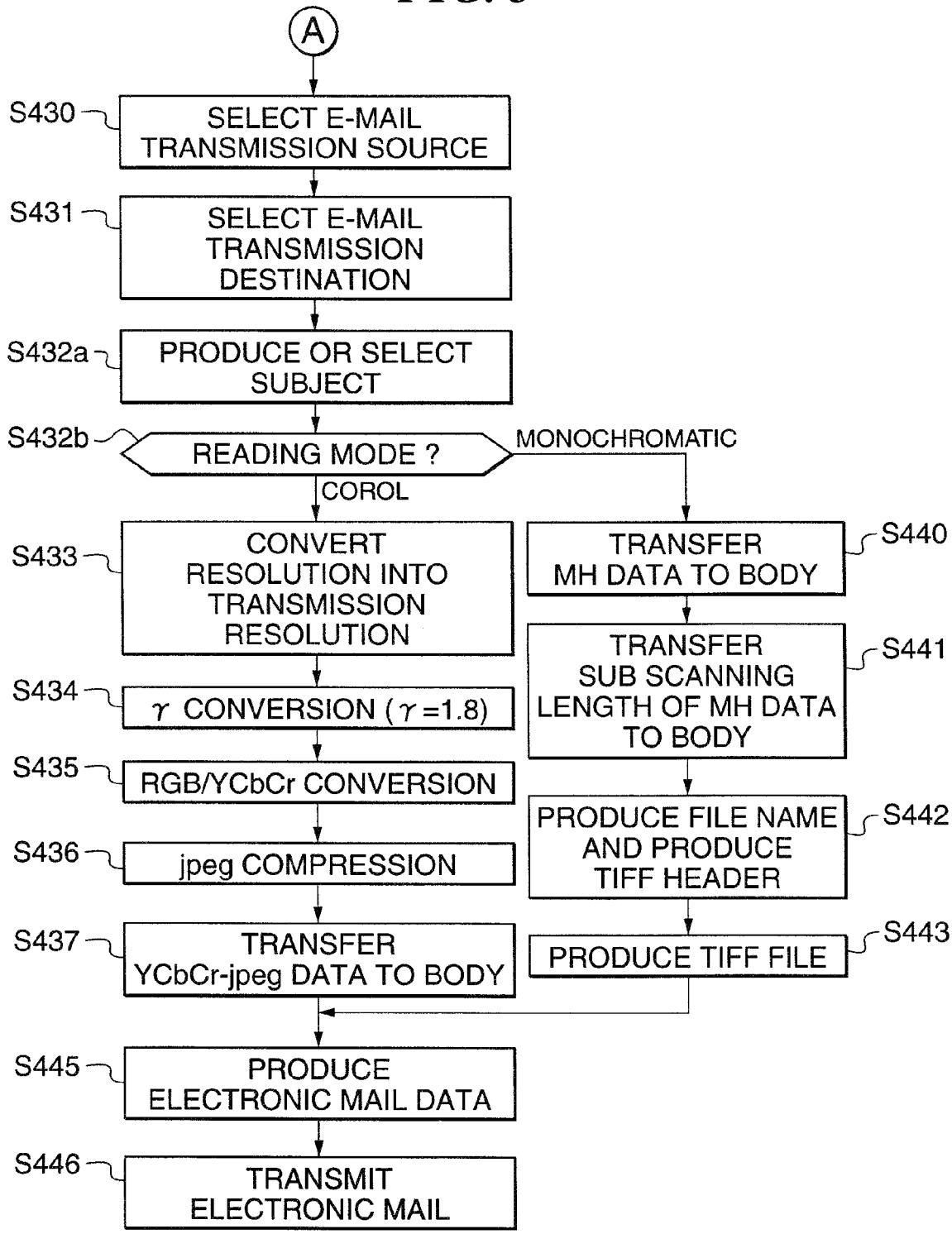
FIG. 5 is a flow chart showing a continued part of the FIGS. 4A and 4B process.
Figure 6:
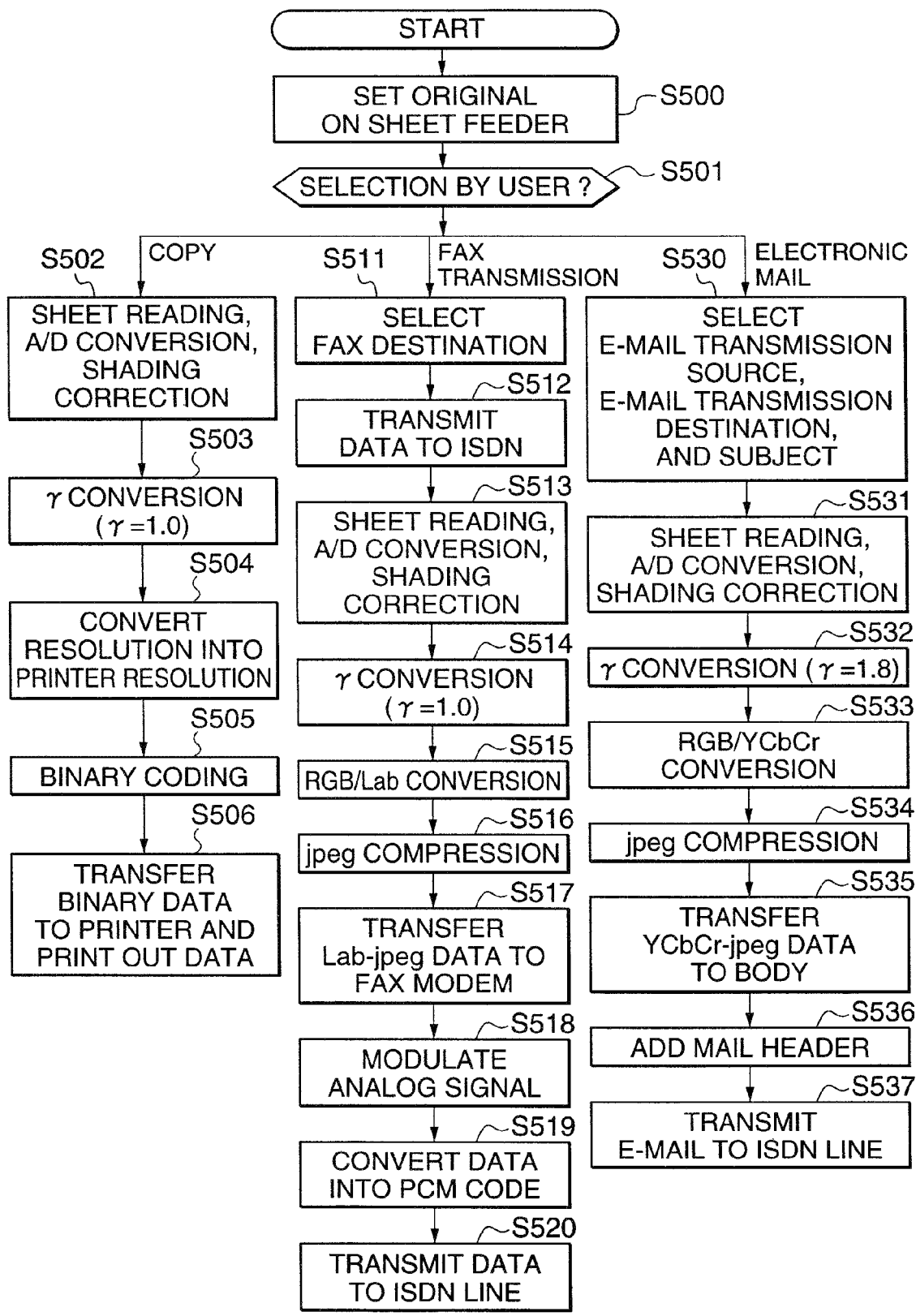
FIG. 6 is a flow chart showing a process for reading sheets according to the first embodiment of the present invention.
Figure 7:
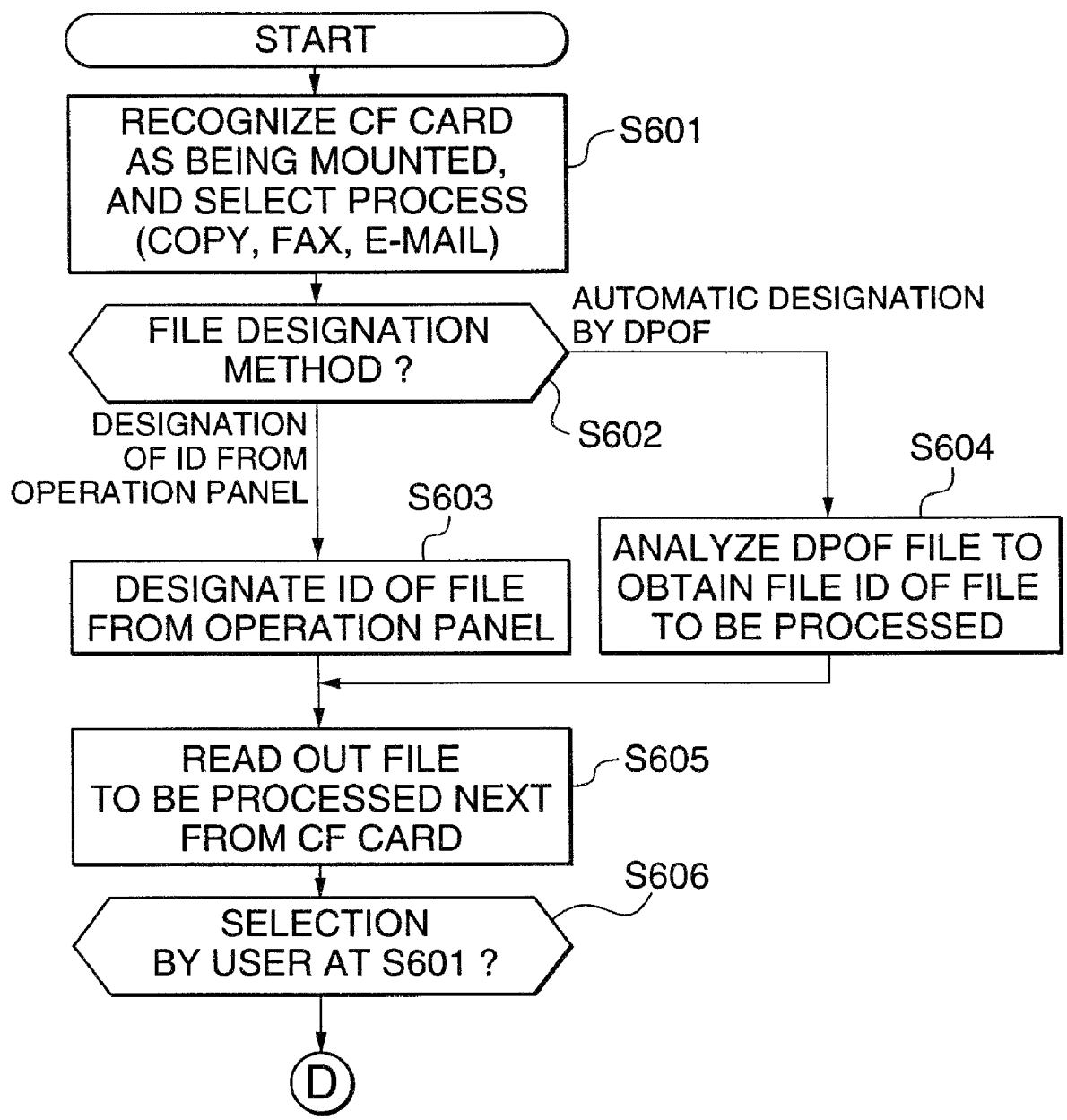
FIG. 7 is a flow chart showing a process for obtaining image data from an external recording medium (CF card) according to the first embodiment of the present invention.
Figure 8:
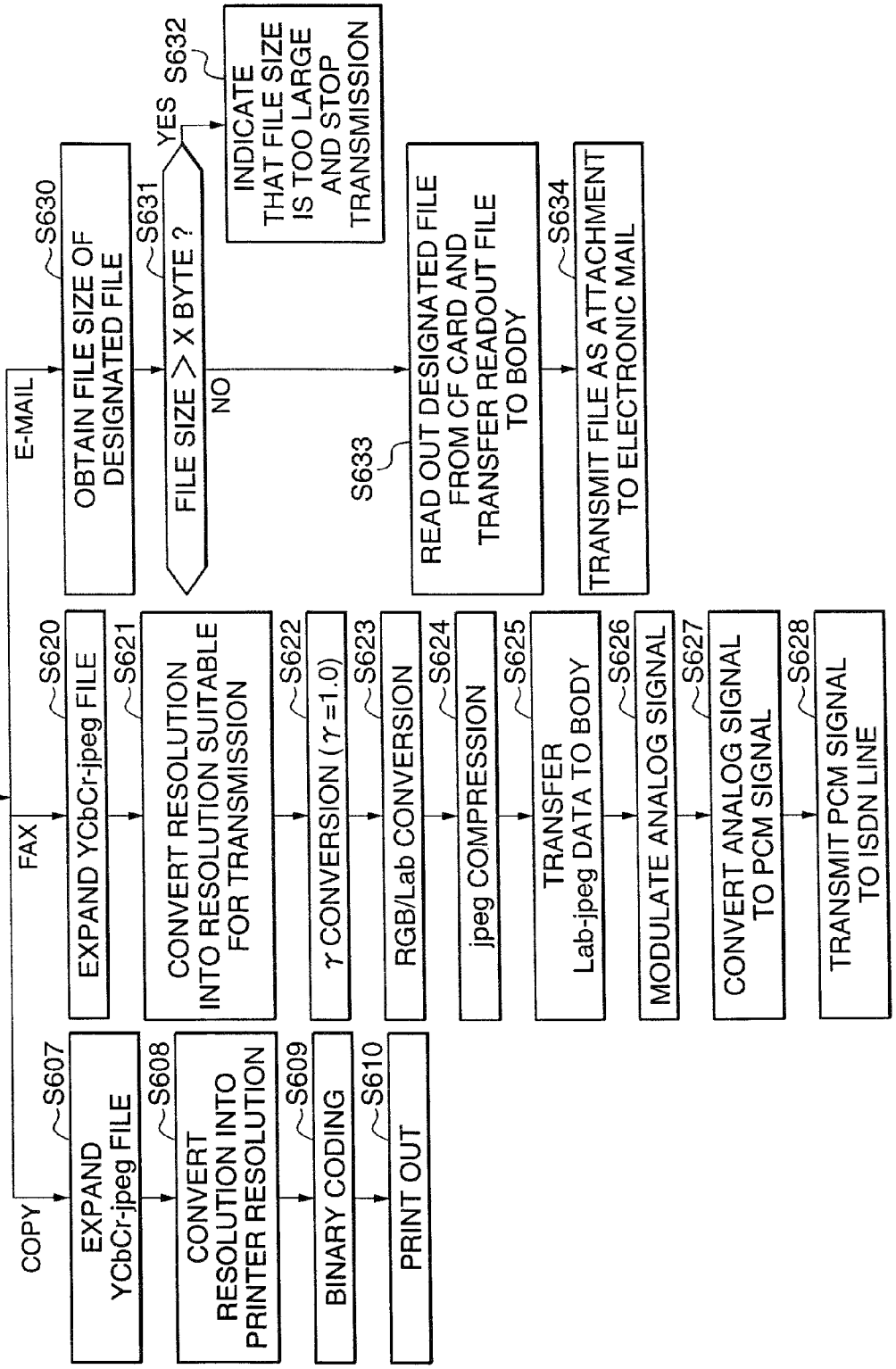
FIG. 8 is a flow chart showing a continued part of the FIG. 7 process.

FIGS. 2A and 2B is a block diagram showing the arrangement of the facsimile apparatus 102 as the data communication apparatus according to the first embodiment and the hand scanner 102 in the communication system of FIG. 1. The facsimile apparatus 101 according to the first embodiment is comprised of a CPU 201, a ROM 203, a SRAM 204, a CPU 205, a ROM 207, a RAM 208, a shared register 209, a shared register 210, a printer image processing section 211, a color printer 212, an operation panel 213, a fax modem 214, a handset 215, a speaker 216, a cross point switch 217, a DSU 219, an ISDNI interface 220, a HDLC controller 221, a PIAFS controller 222, a PHS processing section 223 having a CPU 224 and a TDMA processing section 225, a 1.9 GHz high frequency section 226, a PCM CODEC 227, a PCM CODEC 228, a PCM/ADPCM converting section 229, a PCM/ADPCM converting section 230, a path selector switch 231, and a path selector switch 232. The hand scanner 102 is comprised of a CPU 241, a RAM 241, a CIS 243, an A/D converting section 244, a shading correcting section 245, a color conversion selecting section 246, a RGB/LAB color space converting section 247, a RGBY/CbCr color space converting section 248, a γ converting section A 249, a JPEG compressing expanding section 250, a γ converting section B 251, a resolution converting section 252, a CF card interface 253, and a binary-coding section 255.

The arrangement of the facsimile apparatus will now be described in detail. In the facsimile apparatus 101, the CPU 201 reads a program stored in the ROM 203 through a system bus 202 including data and address buses, and carries out various controlling operations including later described controlling operations according to the program using the SRM 204 as a work memory. The CPU 205 reads a program stored in the ROM 207 through a system bus 206 including data and address buses, and carries out various controlling operations such as JPEG compression and expansion of digital image data by middleware using the RAM 208 as a work memory.

A system of components on the side of the CPU 201 interconnected by the system bus 202 and a system of components on the side of the CPU 205 interconnected by the system bus 206 exchange data through the shared register 209 connected between them. Likewise, the system on the side of the CPU 205 and the hand scanner 102 exchange data through the shared register 210 connected between them.

The operation panel 213 connected to the system bus 206 is equipped with a display such as a LCD, numeric keys, various kinds of keys, and an electronic mail button. The operation panel 213 is used for a user to operate the facsimile apparatus 101 and is used to display the operating conditions of the facsimile apparatus 101.

The fax modem 214 is controlled by the CPU 205 through the system bus 206, and is connected to the cross point switch 217. The handset 215 and the speaker 216 are also connected to the cross point switch 217. With this arrangement, sounds inputted from a communication line and analog data from the facsimile apparatus can be supplied to the handset 215, the speaker 216 and the fax modem 214 via the cross point switch 217, and sounds and analog data outputted from the handset 215 and the fax modem 214 can be outputted to the communication line.

The DSU (Digital Service Unit) 219 connected to an ISDN line (U point) 218 converts data, which is exchanged between the ISDN line 218 and an exchange, into TTL level signals.

The ISDN interface 220 controls layers 1 to 3 of the ISDN, and has a function of inputting and outputting data in a channel B of the ISDN. The HDLC controller 221 assembles and disassembles data of a HDLC (Highlevel Data Link Control procedure) format in the ISDN. The PIAFS (PHS Internet Access Forum Standard) controller 222 is a radio data communication protocol format processing section that assembles and disassembles frames in a radio data communication protocol format.

In the PHS processing section 223, the CPU 224 carries out a process for protocol process for PHS (Personal Handyphone System) radio communication, and the TDMA (Time Division Multiple Access) processing section 225 assembles and disassembles frames transmitted and received by time-division multiplexing in four slots. The 1.9 GHz high frequency section 226 connected to the PHS processing section 223 transmits and receives radio waves of a 1.9 GHz band. It should be noted that the use of the PHC processing section 223 enables a digital cordless telephone to be accommodated as an extension.

The PCM CODECs 227, 228 convert analog signals and PCM (Pulse Code Modulation) code data. The PCM/ADPCM converting sections 229, 230 convert ADPCM (Adaptive Differential Pulse Code Modulation) code data transmitted through a radio line of the PHS.

The path selector switches 231, 232 are switched for selecting an analog signal such as a facsimile signal or a sound signal transmitted from a digital cordless telephone via the PHS processing section 223 as data to be transmitted through the ISDN line 218 under the control of the CPU 201.

There will now be described principal signal lines. Reference numeral 233 denotes a serial communication line for exchanging control signals between the CPU 201 and the CPU 205. Reference numerals 234 to 236 denote serial signal lines which are inputted to and outputted from the ISDN interface 220. The ISDN interface 220 selects two lines among those signal lines, and connects them to channels B1 and B2 of the ISDN line 218. Reference numerals 237 and 238 denote signal lines which are inputted to and outputted from the fax modem 214 and the handset 215. Reference numeral 239 and 240 denote signal lines for ADPCM-coded sound data which are inputted to and outputted from the digital cordless telephone.

The arrangement of the hand scanner will now be described in detail. In the hand scanner 102, the CPU 241 formed of a one-chip microprocessor or the like reads a program stored in an internal ROM or the like and carries out various controlling operations including later-described controlling operations through a system bus 254 including data and address buses according to the program using the RAM 242 as a work memory.

The CIS (Contact Image Sensor) 243 for reading an image on an original includes a LED array for emitting red (R), green (G) and blue (B) lights and a line CCD. Upon receipt of a read timing signal, the CIS 243 outputs a video signal representing a read image in synchronism with the read timing signal. The A/D converting section 244 converts the video signal outputted from the CIS 243, from analog form to digital form. The shading correcting section 245 performs shading-correction of RGB image data outputted from the A/D converting section 244.

Under the control of the CPU 241, the color conversion selecting section 246 selects a place from which the RGB image data is inputted and a place to which the RGB image data is outputted. The place from which the RGB image data is inputted is selected from the shading correcting section 245 and the RAM 242, and the place to which the RGB image data is outputted is selected from the γ converting section A 249, the γ converting section B 251, and the RAM 242.

For color facsimile communication, the inputted RGB image data is outputted to the γ converting section A 249, and the resulting data is outputted to the RGB/LAB color space converting section 247.

Consequently, the RGB image data is converted into image data of a CIELab color space. On the other hand, when a color image is transmitted as an attachment to an electronic mail, the inputted RGB image data is outputted to the γ converting section B 251, and the converted data is outputted to the RGB/YCbCr color space converting section 247. Hence, the RGB image data is converted into image data of a YCbCr color space.

It should be noted that the γ conversion performed by the γ converting section A 249 is similar to the γ conversion performed by γ converting section B 251 except for a value of γ, because different parameters are used in the γ conversion between a color facsimile intended for printing and an electronic mail intended for display. Usually, the value of γ is equal to 1.0 in the case of a color facsimile whereas the value of γ is equal to about 1.8 or 2.2 in the case of a display.

The JPEG compressing and expanding section 250 performs DCT (Discrete Cosine Transform) of the inputted image data of the Lab or YcbCr color space, and then quantizes/Huffman-codes the image data to output JPEG (Joint Photographic Expert Group) image data. Also, the JPEG compressing expanding section 250 expands the inputted JPEG data to output RGB uncompressed image data. The same algorithms are used in the DCT operation and the quantization/Huffman-coding as in the conventional JPEG compression.

The binary-coding section 255 converts image data of RGB color space into CMYK binary data for printing, or converts image data of a gray scale into monochromatic binary data for printing. The CF card interface 253 provides interface for use in reading JPEG image data that is captured by a digital camera, etc. to be recorded in a CF (Compact Flash) card, etc. The resolution converting section 252 converts the resolution of RGB image data.

The RGB/YCbCr converting section 248 converts the γ (=1.0)-converted RGB data of 256 gradations into YCbCr data of 256 gradations. The RGB/YCbCr converting section 248 obtains the values of Y, Cb, Cr for each pixel by carrying out the following operations for the values of R, G, B for each pixel:

$Y=0.29900R+0.58700G+0.11400B-0\times80$ $Cb=-0.16874R-0.33126G-0.500000B$ $Cr=0.50000R-0.41869G-0.08131B$ The RGB/Lab converting section 247 converts the γ (=1.8 or 2.2)-converted RGB data of 256 gradations into Lab data of 256 gradations. The RGB/Lab converting section 247 obtains the values of L, a, b for each pixel by carrying out the following operations for the values of R, G, B for each pixel:

$x=(8164*R+6004*G+2281*B)/(2^{\wedge}22);$ $y=(3666*R+12872*G-90*B)/(2^{\wedge}22);$ $z=(302*R-887*G+17027*B)/(2^{\wedge}22);$ if(x>1.0)x=1.0;if(x<0.0)z=0.0;

if(y>1.0)y=1.0;if(y<0.0)y=0.0;

if(z>1.0)z=1.0;if(z<0.0)z=0.0;

if(x<0.008856)[$x=7.787*x+16/116;$]else $x=x^{\wedge}(1/3);$ if(y<0.008856)[$y=7.787*y+16/116;$]else $y=y^{\wedge}(1/3);$ if(z<0.008856)[$z=7.787*z+16/116;$]else $z=z^{\wedge}(1/3);$ $l1=116*y-16;$ $a1=500*(x-y);$ $b1=200*(y-z);$ $L=l1*2.56;$ if(L<0)L=0; if(L>255)L=255;

$a=(a1*255/170)+128;$ if(a<0)a=0; if(ia>255)a=255;

$b=(b1*255/200)+96;$ if(b<0)b=0; if(b>255)b=255;

There will now be described the initialization of the facsimile apparatus. The present facsimile apparatus has a function of presetting a destination address and electronic mail related information to enable the easy transmission by facsimile and electronic mail. Destinations of facsimiles or phone calls may be registered in a telephone directory. The procedure for registration will be described below. Note that the CPU 201 of the facsimile apparatus 101 provides control relating to the initialization.

The user inputs the name of a destination by means of numerals, alphabets, hiragana letters, katakana letters, Chinese characters, and marks through numeric keys of the operation panel 213, and then inputs a telephone number. If there is any additional information, the user subsequently inputs the corresponding items. Each piece of information is used as one telephone number data. Registered telephone number data is selected by designating a registered name so that it can be used for communication. Incidentally, users in Japan usually input such information by means of hiragana letters and Chinese characters, and thus, hiragana letters and Chinese characters are set as defaults if the present facsimile apparatus is intended to be installed in Japan. In this case, the defaults can be switched to alphabets by operating predetermined keys.

As for the transmission of an electronic mail, the following items are set. It should be noted that the following items are set interactively on a user interface screen displayed in a display section of the operation panel 213 in the facsimile apparatus 101. The transmission of an electronic mail requires information for connection with an ISP (Internet Service Provider) and information for designating a destination address.

The connection with the ISP requires an access telephone number of the ISP; a login name and password supplied by the ISP; and a primary name server address, a secondary name server address and an SMTP server name of the ISP. Such information is inputted by means of numerals, alphabets, hiragana letters, katakana letters, Chinese characters, and marks through numeral keys of the operation panel 213. If there is any additional information, the corresponding items are subsequently inputted. Since such additional information can be inputted by using only alphanumeric characters, the depression of an OK key in response to a question asking whether server information is to be inputted or not on the user interface screen of the operation panel 213 automatically switches an input mode to a mode for inputting frequently-used alphanumeric characters (alphanumeric character input mode).

A user name is given to a group of such data in order to keep a plurality of sets of information for connection with the ISP. A user name is inputted by means of numerals, alphabets, hiragana letters, katakana letters, Chinese characters, and marks through numeric keys of the operation panel 213. Note that hiragana letters and katakana letters are selected as defaults for the input mode as in the case where a destination of a phone call is inputted as described above. Each piece of information is used as one connection data. Registered connection data is selected by designating a user name so that it can be used for communication.

The designation of a destination address requires an electronic mail address of the destination. Such a destination address is registered by inputting the name of the destination and an electronic mail address of the destination by means of numerals, alphabets, hiragana letters, katakana letters, Chinese characters, and marks through numeric keys of the operation panel 213. When the name of a destination is inputted, the depression of the OK key in response to a question asking whether the name of a destination is to be inputted or not on the user interface screen of the operation panel 213 automatically switches the input mode to a mode for inputting hiragana letters and Chinese characters. When an electronic mail address is inputted, the depression of the OK key in response to a question asking whether an electronic mail address is to be inputted or not on the user interface screen of the operation panel 213 automatically switches the input mode to a mode for inputting alphanumeric characters which are frequently used to represent electronic mail addresses (alphanumeric character input mode).

If there is any additional information, the corresponding items are subsequently inputted. Each piece of such information is used as one destination address data. Registered destination address data is selected by designating a registered name so that it can be used for communication. The destination address data is registered together with the telephone number data in the telephone directory, and is also registered in an electronic mail directory containing only destination address data independently from the telephone directory.

The present facsimile apparatus may also transmit an electronic mail with a subject that is optionally added, although this is inessential. A subject of an electronic mail is inputted by means of numerals, alphabets, hiragana letters, katakana letters, Chinese characters, and marks through numeric keys of the operation panel 213. When a subject of an electronic mail is inputted, the depression of the OK key in response to a question asking whether a subject of an electronic mail is to be inputted or not on the user interface screen of the operation panel 213 automatically switches the input mode to a mode for inputting kana letters and Chinese characters which are frequently used in Japan (kana letter input mode).

Thus, according to the present embodiment, the CPU 201 of the facsimile apparatus 101 provides control so as to set the character input mode to the alphanumeric character input mode for inputting alphanumeric characters which are frequently used as indicating electronic mail addresses, upon recognizing input of an electronic mail address, to set the character input mode to the kana letter input mode for inputting kana letters and Chinese characters which are frequently used as indicating subjects of electronic mails, upon recognizing input of a subject of an electronic mail, and to set the character input mode to the alphanumeric character input mode for inputting alphanumeric characters which are frequently used as indicating server information, upon recognizing input of information of a server to which the facsimile apparatus 201 is to be connected.

The arrangement of the telephone directory that can contain electronic mail data will now be described. A telephone number list and a destination address list are stored on the RAM 208. A pointer is put on the telephone number list or the destination address list according to a value of an electronic mail flag from structures having electronic mail flags and name information. A group of structures is stored on the RAM 208 as an array that is sorted according to the name information. When electronic mail addresses are registered in the telephone directory, they are stored together with electronic mail flags and displayed with marks on the telephone directory.

It should be noted that during the transmission by telephone/facsimile the selection of an electronic mail address from the telephone directory is inhibited and during the transmission by electronic mail the selection of a telephone number from the telephone directory is inhibited, to thereby avoid an erroneous operation.

A description will be given of the operation of the facsimile apparatus in the case where the electronic mail button is depressed. The following three kinds of images can be transmitted as attachments to electronic mails:

images read by manual scanning using the hand scanner
  images read by automatic scanning using the hand scanner 102 mounted in the facsimile apparatus 101
  images captured by a digital camera, etc. and stored in an external memory card When the electronic mail button is depressed, a message [Scanner Original Card] is displayed in the display section.

The input of each image is started when the user selects one of Scanner, Original, and Card by operating the key of the operation panel 213.

If Scanner is selected, an image stored in the hand scanner 102 is transferred to the facsimile apparatus 101. This will be described later in detail in "1) the input of an image by reading with the hand scanner alone" in the items of description of various operations.

If Original is selected, an operation for reading an original is started. This will be described later in detail in "2) the input of an image by reading a sheet" in the items of description of various operations.

If Card is selected, image data is transferred from a memory card through the CF card interface section 253 in the hand scanner 102. This will be described later in detail in "3) the input of an image from outside" in the items of description of various operations.

It should be noted that an image stored in the scanner or in the external memory card may be transmitted by electronic mail by operating the operation panel if the hand scanner 102 is mounted in the facsimile apparatus 101. This will be described later in detail in the description of various operations.

There will now be described in detail the various operations of the facsimile apparatus in the communication system according to the first embodiment of the present invention with reference to the flow charts of FIGS. 3 to 8.

The present facsimile apparatus is capable of printing (copying) a read image and transmitting a read image by facsimile or electronic mail. One of these operations is selected by operating the operation panel 213. There are three ways for inputting an image as follows.

1) An image is read by the hand scanner 101 alone.

2) A sheet is read in a state wherein the hand scanner 102 is mounted in the facsimile apparatus 101; and 3) An image is inputted from the digital camera 103, etc. by way of an external memory card.

There will now be described the operation of the facsimile apparatus in each case.

1) A Case where an Image is Inputted by Reading with the Hand Scanner Alone

After detaching the hand scanner 102 from the facsimile apparatus 101, the user determines whether an image should be read as a color image or as a monochromatic image with the hand scanner 102 (step S301). The user then presses a start key of the hand scanner 102 (step S302), and manually moves the hand scanner 102 to start reading the image (step S303). If it is determined that the image should be read as a color image, the CIS 243 outputs a video signal when the hand scanner 102 starts reading a color image, and the outputted video signal is A/D converted (step S304) and shading-corrected (step S305). The shading-corrected image data is stored as uncompressed image data of 8 bits in RBG colors in the RAM 242 (step S306).

If it is determined that the image should be read as a monochromatic image, an original is read in a gray scale by the CIS 243 of the hand scanner 102, and is A/D converted by the A/D converting section 244 (step S307). The data is then shading-corrected by the shading-correcting section 245 (step S308), and the resulting gray scale data (multi-valued data per pixel) is binary-coded per pixel by the binary-coding section 255 (step S309). The data is then MH-compressed by the CPU 241 (step S310), and the resulting MH image data is stored in the RAM 242 (step S311). On this occasion, the number of lines in the read image is stored separately from the image data (step S312).

If the hand scanner 102 is mounted in the facsimile apparatus 101 after the reading of the image, a message [Copy, FAX, E-mail] is indicated in the display section of the operation panel in the facsimile apparatus 101 (step S401).

The selection of Copy starts a process for printing the image data stored in the hand scanner 102. If it is determined that the image data should be read as a color image, the resolution of the RGB uncompressed image data stored in the RAM 242 of the hand scanner 102 is converted into a resolution suitable for printing by the resolution converting section 252 (step S403) and is RGB/CMYK converted (step S404) into print data, which is temporarily stored in the RAM 242. The print data stored in the RAM 242 is transmitted to the color printer 212 via the shared register 210 to print a color image (step S405).

Likewise, the monochromatic MH image data is transferred to the facsimile apparatus 101 (body) in the same route as described above without being processed. A CPU of the facsimile apparatus 101 (body) expands the MH data (step S406) and outputs it to the printer 212 so that a monochromatic image can be printed (step S407).

The selection of FAX starts a process for transmitting image data stored in the hand scanner 102 by facsimile. First, the user selects a FAX destination from the telephone directory (step S410). If the user designates a color mode to transmit a color image obtained by scanning, a signal is transmitted to the selected telephone number through the ISDN (S411). If there is a response from the ISDN line 218, the resolution of the RGB uncompressed image data stored in the RAM 242 is converted into a resolution suitable for transmission (200 dpi) by the resolution converting section 252. (step S412). The image data is then inputted to the color conversion selecting section 246, and is converted into Lab image data by way of the γ conversion by the γ converting section A249 (step S413) and the RGB/Lab conversion by the RGB/Lab converting section 247 (step S414). The Lab image data is then converted into Lab-jpeg image data by the JPEG compressing section (step S415).

In the description of the present embodiment, JPEG image data obtained by JPEG-compressing the Lab image data is called Lab-jpeg image data, and similarly, JPEG image data obtained by JPEG-compressing YCbCr image data is called YCbCr-jpeg image data. The obtained Lab-jpeg image data is temporarily stored in the RAM 242.

If the user designates a monochromatic mode to transmit monochromatic MH image data obtained by scanning, the MH data is transferred to the facsimile apparatus 101 (body) without being processed in the above mentioned manner (step S416). The Lab-jpeg image data or the MH image data stored in the RAM 242 in this manner is transferred to the fax modem 214 via the shared register 210. The fax modem 214 modulates an analog signal according to the image data (step S418), and the modulated analog signal is converted into a PCM code by the PCM CODEC 237 (step S419) and is transmitted to the ISDN line 218 (step S420).

If a color image is transmitted, the received JPEG image data received through the ISDN line 218 can be expanded and printed if the destination facsimile apparatus (FAX 105 in FIG. 1) has a color facsimile function.

The selection of E-mail starts a process for transmitting the image data stored in the hand scanner 102 by electronic mail. Since it is legally prescribed that predetermined header information must be added to electronic mails on the Internet, there is the need for adding such predetermined information as "To:" (destination address), "From:" (sender), "Subject:" (subject), "Cc:" (carbon copy), and "Date:" (date) to the top of JPEG data that is to be transmitted.

Accordingly, one is first selected from a plurality of registered transmission sources on the operation panel 213 (step S430). This process may be omitted if only one transmission source is registered. Each transmission source is comprised of a user name, an electronic mail address, a login name, a password, an access telephone number, a primary name server address, a secondary name server address, and an SMTP server name. The transmission sources are registered according to the above described initial registration procedure.

Next, a destination is selected (step S431). The destination is selected from a registered telephone directory or electronic mail directory (step S427), or is designated by inputting numerals, alphabets and marks through numeric keys. The electronic mail directory only indicates destinations interpedently from the telephone directory. Information inputted through the numeric keys can be registered in the telephone directory or the electronic mail directory. Further, a subject is designated (step S432). A subject is selected from a registered subject directory or is designated by inputting numerals, alphabets, hiragana letters, katakana letters, Chinese characters and marks through numeric keys. The information inputted through the numeric keys can be registered in a subject directory.

If it is determined by the user that the image data should be read as a color image, a color jpeg image is transmitted as a file attached to an electronic mail. Due to its large file size, the RGB uncompressed image data stored in the RAM 242 of the hand scanner 102 must be compressed and converted into jpeg image data of a YCbCr color space for use in the PC.

Therefore, the resolution of the RGB uncompressed image data stored in the RAM 242 is converted into a resolution suitable for transmission (e.g. 200 dpi) by the resolution converting section 252 (step S433). The RGB uncompressed image data is subjected to selection of color conversion by the color conversion selecting section 246 and the γ conversion by the γ converting section B 251 (step S434), and further subjected to the RGB/YcbCr conversion by the RGB/YcbCr converting section 248 (step S435) into image data of the YCbCr color space. The resulting YCbCr color space image data is compressed into YCbCr-jpeg data by the JPEG compressing and expanding section 252 (step S436) to be temporarily stored in the RAM 242. The YCbCr-jpeg data is then transferred to the RAM 208 of the facsimile apparatus 101 (step S437), and is stored as a JPEG file in the SRAM 402.

If it is determined by the user that image data should be read as a monochromatic image, a monochromatic TIFF image is transmitted as a file attached to an electronic mail. The MH data stored in the RAM 242 of the hand scanner 102 is transferred to the RAM 208 of the facsimile apparatus 101 (step S440), and is stored in the SRAM 204.

The MH data is then converted into a TIFF file that can be handled by the PC. The MH data is changed into TIFF format image data by adding a TIFF header thereto, but this requires additional data of the number of longitudinal lines in an image to be stored in the TIFF header. To this end, after transmitting the MH data to the facsimile apparatus 101 (body) (step S441), the CPU 241 of the hand scanner 102 transmits the data of the number of longitudinal lines in the image stored previously in the RAM 242 during the scan to the facsimile apparatus 101 (body) via the shared register 210. The facsimile apparatus 101 (body) produces a TIFF header including the data of the number of longitudinal lines (step S442), and adds it to the MH image data to produce the TIFF file (step S443).

A description will now be given of the electronic mail transmission control. This control is executed by the CPU 201 of the transmission apparatus 101.

It is complicated to input an attached image file name included in the TIFF header by operating the keys. Thus, in the present embodiment the file name of an attached image file is generated by using the subject inputted by the user through the operation panel 213. If an original of multiple pages is transmitted with each page being an attachment to an electronic mail, the number of pages is counted to generate a file name in which a page number is added to the end of the subject. For example, if the subject is "Original", such file names as "Original 1", "Original 2" . . . with respective extensions added are generated. If an original of only one page is transmitted or if an original of multiple pages is transmitted as one file, a file name identical with the subject is generated. Thus, the user can add a file name merely by inputting a subject alone without the need of manually inputting both the subject and the file name. Besides, since a file name is thus generated from the subject, the file name represents the contents of data transmitted by electronic mail.

Further, the user can input a desired file name. In this case, he must set in advance whether the file name is to be automatically generated or to be input at the time of transmission of the electronic mail.

Furthermore, an electronic mail can be transmitted with image data obtained from an external device such as a digital camera using a CF card, as an attached file. In this case, since a file name is already added, and hence whether this file name is to be used or a new file name is to be generated from the subject can be selected.

Thus, according to the present embodiment, in transmission of images of multiple pages, a page number allotted to each of the images converted into files is combined with the subject of the electronic mail that is inputted, to generate an attached image file name, and the electronic mail is transmitted with the image data in the form of files attached thereto together with the generated attached image file names. Further, a file name or a subject of image data obtained from an external device is processed to generate an attached image file name, and an electronic mail is transmitted with the image data file together with the generated attached image file name.

The JPEG/TIFF file generated in the above described manner is converted into a text in a method such as base 64 and uuencode, and an electronic mail header is added to the JPEG/TIFF file to produce electronic mail data (step S445).

Upon completion of the electronic mail data, a signal is transmitted to the designated provider 106 through the ISDN. If there is a response from the ISDN line, a communication path is connected to set a line of communication with the provider. Then, a server of the provider is logged in according to a PAP, and the electronic mail data stored in the SRAM 204 is transmitted according to the SMTP protocol.

Specifically, the electronic mail data is transferred from the SRAM 204 to the HDLC controller 221 to be assembled into an HDLC frame, and is then transmitted to the provider via the ISDN interface 220 (sep S446).

When the PC 107 at the destination of the electronic mail receives the electronic mail data via the Internet, a user at the destination can obtain a JPEG/TIFF data file attached to the electronic mail. The user can also see the received image by software such as a browser operating on the PC 107 and having a JPEG/TIFF data displaying function.

After the transmission of the electronic mail, the destination is stored in a redial buffer or an electronic mail redial buffer. The redial buffer sorts the transmitted phone messages/transmitted electronic mails according to the operation start time to store several telephone numbers/addresses in order sequentially from the latest one. The electronic mail redial buffer sorts the transmitted electronic mails according to the operation start time to store several destination addresses from the latest one.

It should be noted that a facsimile or electronic mail may be transmitted after the selection of a telephone number/electronic mail address. This is started by pressing a telephone directory key on the operation panel 213 in the facsimile apparatus 101. Upon depression of the telephone directory key, the telephone numbers/electronic mail addresses registered in the telephone directory are displayed. An electronic mail address can be recognized by a character "E" at the end. The selection of a telephone number automatically selects a telephone/facsimile transmission mode, and the selection of an electronic mail address automatically selects an electronic mail transmission mode.

In addition, the above-mentioned electronic mail button may be used to transmit an image read by the hand scanner 102 by electronic mail. Upon depression of the electronic mail button, the message [Scanner Original Card] is indicated. On this occasion, the selection of Scanner enables the transmission of the image stored in the hand scanner 102 by electronic mail.

2) A Case where an Image is Inputted by Reading a Sheet

An image is read from the hand scanner 102 by means of the sheet feeder for copying, facsimile transmission, and electronic mail transmission with the hand scanner 102 being mounted in the facsimile apparatus 101 (body), the user sets an original on the sheet feeder first (step S500) and selects one process from the copy, the facsimile transmission, and the electronic mail transmission, by depressing a corresponding button (step S501).

If a copy button is depressed, the original is fed to cause the hand scanner 102 to start reading the image. The CIS 243 of the hand scanner 102 outputs a video signal, which is then A/D converted by the A/D converting section 244 and is shading-corrected by the shading-correcting section 245 (step S502). The shading-corrected image data is γ converted by the γ converting section A249 (S503), and the resolution thereof is converted into a resolution suitable for printing by the resolution converting section 252 (step S504). The image data is then converted into print binary data by the binary-coding section 255 (step S505), and is temporarily stored in the RAM 242. The print binary data is transferred from the RAM 242 to the printer 212 via the shared register 210 to be printed out (step S506).

The transmission by facsimile is started if a facsimile transmission button is depressed after the operation of the dial in the facsimile apparatus 101 or is depressed after the selection of a destination registered in the telephone directory. Upon selection of a destination from the telephone directory (step S511), a signal is transmitted to the selected telephone number through the ISDN (step S512). If there is a response from the ISDN line 218, a reading operation is started.

The CIS 243 of the hand scanner 102 reads an original, which is A/D converted by the A/D converting section 244. RGB image data outputted from the A/D converting section 244 is shading-corrected by the shading correcting section 245 (step S513). The image data is then γ converted by the γ converting section A249 (step S514), converted into Lab image data by the RGB/LAB color space converting section 248 (step S515), and coded (compressed) by the JPEG compressing and expanding section 250 (step S516). The resulting JPEG data is outputted to the RAM 242 of the hand scanner 102.

The JPEG data is transferred from the RAM 242 to the fax modem 214 via the shared register 210 (step S517). The fax modem modulates an analog signal according to the JPEG data (step S518), and the modulated analog signal is converted into a PCM code by the PCM CODEC 237 (step S519) and transmitted to the ISDN line 218 (step S520). If the facsimile apparatus at the destination (FAX 105 in FIG. 1) has a color facsimile function, i.e. a Lab-jpeg expanding function, the JPEG image data received through the ISDN line 218 can be expanded and printed.

If "Original" is selected or an electronic mail address is selected from the telephone directory after the depression of the electronic mail button, the image is read to start the transmission by electronic mail. Prior to the production of electronic mail data, a destination and a subject are designated as described above in 1) "A case where an image is inputted by reading with the hand scanner alone". Upon completion of the designation, the production of the electronic mail data is started (step S530).

If an image on a color original is read from the hand scanner 102 by the sheet feeder for transmission, the original is read by the CIS 243 of the hand scanner 102 and is A/D converted by the A/D converting section 244. The RGB image data outputted from the A/D converting section 244 is shading-corrected as is known by the shading-correcting section 245 (step S531), and is γ converted by the γ converting section B 251 (step S532), converted into YCbCr image data by the RGB/YCbCr color space converting section 248 (step S533), and coded (compressed) by the JPEG compressing and expanding section 250 (step S534) to output YCbCr-jpeg image data to the RAM 242 of the hand scanner 102. This data is transferred to the RAM 208 of the facsimile apparatus 101 (step S535), and is converted into a text and is provided with an electronic mail header (step S536) to produce electronic mail data.

Upon completion of the production of the electronic mail data in this manner, a signal is transmitted to the designated provider 106 through the ISDN (step S537). Thereafter, the same operations are carried out as in the case where the image is read by the hand scanner 102.

3) A Case where an Image is Inputted from Outside

The hand scanner 102 is equipped with the CF card interface section 253 for connection with the CF card. Thus, if JPEG image data captured by the digital camera 103 or the like is stored in the CF card, mounting the CF card in the hand scanner 102 enables the captured image data to be printed, transmitted by facsimile, or transmitted by electronic mail. File names are given to JPEG files written in the CF card by the digital camera 103 according to a DCF (Design rule for Camera File system). Each file can be represented by a file ID comprised of three digit numeric value-four digit numeric value.

If the CF card is recognized as being mounted in the hand scanner 102 when the hand scanner 102 is mounted in the facsimile apparatus 101, the message [Copy, FAX, E-mail] is indicated in the display section of the operation panel 213 in the facsimile apparatus 101 (step S601). Upon selection of one process from [Copy, FAX, E-mail], it is determined whether a file ID of an image to be processed next is to be designated on the operation panel 213 or to be designated in a DPOF (Digital Print Order Format) or the like in advance through the camera (step S602).

In the former case, an ID of a file to be transmitted is inputted using the operation panel 213 (step S603). In the latter case, an ID of a file to be processed is obtained by analyzing a DPOF file in the CF card (step S604). The file is then read from the CF card (step S605). It should be noted that the DPOF is a format standard of a command file (DPOF file), which is written in a recording medium to indicate how the image files in the recording medium are to be handled (e.g. printed or transmitted to a specified destination) and is recognized by an apparatus (e.g. FAX) into which the CF card is inserted so that the image files can be automatically printed or transmitted by electronic mail.

In the case where a file ID is designated on the operation panel 213, the file ID is selected from a list of files by using a cursor key or is directly designated by using the numeric keys. It is possible to select a plurality of images, which are specified by designating the first value and the last value of a file ID for use in transmission.

If Copy is selected at the step S601, the YCbCr-jpeg data read out from the CF card is expanded into uncompressed RGB image data by the JPEG compressing and expanding section 250 (step S607). The resolution of the uncompressed RGB image data is converted into a resolution suitable for printing by the resolution converting section 252 (step S608), and is converted into CMYK binary print data by the binary-coding section 255 (step S609). The resulting print data is temporarily stored in the RAM 242. The print data stored in the RAM 242 is transmitted to the color printer 212 via the shared register 210 to print an image (step S610).

If FAX is selected, the JPEG data read out from the CF card is temporarily expanded into uncompressed RGB data by the JPEG compressing and expanding section 250 (step S620). The resolution converting section 252 converts the resolution of the uncompressed RGB data to a resolution suitable for transmission (200 dpi) (step S621), and the resulting data is temporarily stored in the RAM 242. Then, the RGB uncompressed image data is inputted to the color conversion selecting section 246, and is converted into Lab-jpeg data by way of the γ conversion by the γ converting section A 251 (step S622) and the RGB/Lab conversion by the RGB/Lab converting section 247 (step S623), and is stored again in the RAM 242.

Next, upon selection of a destination from the telephone directory, a signal is transmitted to the selected telephone number through the ISDN. If there is a response from the ISDN line 218, the Lab-jpeg data stored in the RAM 242 is transferred to the fax modem 214 via the shared register 210 (step S625). The fax modem 214 modulates an analog signal according to the JPEG data (step S626). The modulated analog signal is converted into a PCM code by the PCM CODEC 237 (step S627), and is transmitted to the ISDN line 218 (step S628).

If E-mail is selected, the JPEG data read out from the CF card is directly transmitted without being processed in the form of a file attached to an electronic mail since the JPEG data can be seen in the form of a file on the PC. However, if a large number of pixels is designated during a photographing operation by the digital camera, it is impossible to store all the captured jpeg image data in the RAM 242 or the RAM 208 or it takes much time to convert the image data into texts and transmit the image data due to the excessively large file size of the jpeg image data. Therefore, in the present embodiment, if a file to be transmitted has a larger file size than a predetermined size, the file is not transmitted as an attachment to an electronic mail and a message to this effect is indicated in the display section of the operation panel 213.

After the user designates a file to be transmitted, the CPU 205 of the facsimile apparatus 101 obtains the file size of the designated file from the CPU 241 of the hand scanner 102 prior to the transfer of the data (step S630). If the obtained file size is larger than a maximum allowable size (x bytes), a warning message is indicated on the operation panel 213 to stop the transmission (step S632). On this occasion, the value of "x" indicative of the maximum allowable size (x bytes) may be a fixed value (set on the operation panel 213) or may be varied according to the residual capacity of the RAM 208. If the obtained file size is smaller than x bytes, the designated JPEG file is read into the RAM 242 (step S633).

Next, if the electronic mail address of the destination of the electronic mail is selected from the telephone directory, the JPEG data stored in the RAM 242 is transferred to the SRAM 204 via the shared registers 210 and 209 so as to produce data attached to the electronic mail. Electronic mail data is then produced and transmitted in the same manner as the step S323.

The details of the transmission by electronic mail are the same as already described above. It should be noted that a name is given to an image captured by the digital camera 103. In this case, an image name is received from the CF card, and is directly used as a file name for an attached image. If no name is given to an image, a subject is directly used as a file name as is the case with an image read by the hand scanner 102.

The above-mentioned electronic mail button may be used for transmission of an image stored in the external memory card. The depression of the electronic mail button indicates the message "Scanner Original Card". On this occasion, the selection of Card enables the transmission of an image stored in the hand scanner 102.

As described above, the facsimile apparatus according to the first embodiment of the present invention combines a page number allotted to each of the images converted into files with the subject of the electronic mail that is inputted, to generate an attached image file name, and transmits the electronic mail with the image data in the form of files attached thereto together with the generated attached image file names. Therefore, it is not necessary to input the name of an image file attached to an electronic mail, which facilitates the operation of transmitting an electronic mail and enables giving a file name that enables the receiver of the electronic mail to easily recognize the contents of the attached image file.

Further, the facsimile apparatus according to the first embodiment of the present invention provides control so as to set the character input mode to the alphanumeric character input mode for inputting alphanumeric characters which are frequently used as indicating electronic mail addresses, upon recognizing input of an electronic mail address, to set the character input mode to the kana letter input mode for inputting kana letters and Chinese characters which are frequently used as indicating subjects of electronic mails, upon recognizing input of a subject of an electronic mail, and to set the character input mode to the alphanumeric character input mode for inputting alphanumeric characters which are frequently used as indicating server information, upon recognizing input of information of a server to which the facsimile apparatus is to be connected. Thus, in inputting electronic mail information, which of alphanumeric characters and kana letters and Chinese characters is more frequently used is automatically determined for each item to be inputted, and the characters determined to be more frequently used are preferentially input, to thereby greatly improve the operability of the apparatus.

In the case where the destination of an electronic mail to be transmitted is considered to be in a country other than Japan judging from the address of an electronic mail as the destination, if a file name in kana letters and Chinese characters is added to the electronic mail, a warning may be displayed before the start of transmission, and the electronic mail may be transmitted after permission of the transmission is input by the user. In this case, if the permission is not inputted, an instruction may be displayed to urge the user to reconsider and input a correct subject and/or a correct file name. Thus, transformation of letters and characters at the destination can be prevented.

Further, the subject and file name of an electronic mail to be transmitted may be inputted by the user at the time of transmitting the electronic mail or selected from ones registered in advance. moreover, the subject and file name of an electronic mail to be transmitted may be selected to those predetermined fixed ones. Besides, a file name corresponding to the kind of an image that is inputted may be automatically added, which makes it easier for the receiver side to recognize the kind of the inputted image than in the case where a predetermined fixed file name is always added. In this case, for example, if a color image has been read, a file name "color image" may be added; if a monochromatic image has been read, a file name "monochromatic image" may be added; and if an original has been read in the photographic width by the hand scanner, a file name "color image" or "monochromatic image" may be added.

Second Embodiment

A communication system incorporating a data communication apparatus according to the second embodiment of the present invention is comprised of a facsimile apparatus 101, a hand scanner 102, a digital camera 103, a communication network 104 such as an ISDN (Integrated Services Digital Network), a facsimile apparatus (FAX) 105 at a destination, an internet service provider (ISP) 106, and a computer (PC) 107 (see FIG. 1) at a destination.

The facsimile apparatus 101 according to the second embodiment is comprised of a CPU 201, a ROM 203, a SRAM 204, a CPU 205, a ROM 207, a RAM 208, a shared register 209, a shared register 210, a printer image processing section 211, a color printer 212, an operation panel 213, a fax modem 214, a handset 215, a speaker 216, a cross point switch 217, a DSU 219, an ISDNI interface 220, a HDLC controller 221, a PIAFS controller 222, a PHS processing section 223 having a CPU 224 and a TDMA processing section 225, a 1.9 GHz high frequency section 226, a PCM CODEC 227, a PCM CODEC 228, a PCM/ADPCM converting section 229, a PCM/ADPCM converting section 230, a path selector switch 231, and a path selector switch 232. The hand scanner 102 is comprised of a CPU 241, a RAM 241, a CIS 243, an A/D converting section 244, a shading correcting section 245, a color conversion selecting section 246, a RGB/LAB color space converting section 247, a RGBY/CbCr color space converting section 248, a γ converting section A 249, a JPEG compressing expanding section 250, a γ converting section B 251, a resolution converting section 252, a CF card interface 253, and a binary-coding section 255 (see FIGS. 2A and 2B).

Elements and parts corresponding or similar to those of the first embodiment are denoted by the same reference numerals, and a detailed description thereof is omitted herein.

According to the first embodiment, the shading-corrected RGB uncompressed data is stored in the RAM 242 of the hand scanner 102 if an image is manually scanned by the hand scanner 102 in the color reading mode. However, if an A4 original is read at a resolution of 200 dpi, the data size is as large as about 12 MB so that the storage of the RGB uncompressed data in the RAM 242 of the hand scanner 102 necessitates the use of a RAM having a a capacity enough to store such large data, which increases the cost of the apparatus.

It is therefore desirable to compress the RGB data in some compression method and store the compressed data in the RAM 242 of the hand scanner 102 when an image is read. However, if the data is stored as YCbCr-jpeg data, for transmission of color image data by facsimile, the data must be temporarily expanded into uncompressed RGB data and then compressed again into Lab-jpeg data. The repetition of JPEG expansion and compression unavoidably deteriorates the quality of the image data. On the other hand, even if the data is stored as Lab-jpeg data, the quality of the image data is deteriorated since it must be converted into YCbCr-jpeg data for transmission by electronic mail.

Therefore, according the second embodiment, when the user manually scans an image by the hand scanner 102, the CPU 201 of the facsimile apparatus 101 checks whether image data is stored in the RAM 242 of the hand scanner 102 or not. If the image data is stored in the RAM 242 of the hand scanner 102, different processes are carried out depending upon the image width designated by the user. Further, in such a case, if it is set such that a file name corresponding to the kind of an image is automatically added to an image file attached to an electronic mail to be transmitted, the file name is determined according to the width of the image.

The photographic width, the A4 width, and the B4 width can be designated as the image width, and the designation of each size restricts the process as follows.

1) The photographic width: a monochromatic image is MH compressed during scanning, and a color image is scanned uncompressed.

2) The A4 width, a monochromatic image is MH compressed during scanning, and a color image is scanned and YCbCr-jpeg compressed to be written into the RAM 242. However, this JPEG data is not transmitted but may only be printed with the hand scanner 102 being mounted in the facsimile apparatus 101 (body).

3) The B4 width: a monochromatic image is MH-compressed during scanning, and a color image is never scanned.

It should be noted that in the case where an original has been read using the hand scanner mounted in the facsimile apparatus 101, if a file name corresponding to the kind of an image is to be automatically added to an image file attached to an electronic mail to be transmitted, the file name is set to either "color image" or "monochromatic image".

A description will be given of the operation in the case where a color image in the photographic width is scanned as in the above item 1). During the scanning, the same operations are carried out as in the first embodiment except that the image width is the photographic size. When the hand scanner 102 is mounted in the facsimile apparatus 101 after the reading of the image, the message [Copy, FAX, E-mail] is indicated in the display section of the operation panel 213 of the facsimile apparatus 101 to urge the user to select one operation.

The selection of Copy starts a process for printing the image data stored in the hand scanner 102. This process is similar to that of the first embodiment.

The selection of FAX starts an operation for transmitting the image data stored in the hand scanner 102 by color facsimile. In this case, however, it is necessary to increase the width of the image in the photographic width since the image width is recommended to be the A4 size in color facsimile according to CCITT. White pixels (R, G, B)=(255, 255, 255) are added to the right and left of a RGB uncompressed image obtained by scanning so that the image width can be equal to the A4 width (1728 pixels at the resolution of 200 dpi). The image is then Lab-jpeg compressed, and the resulting JPEG data is transmitted in the same manner as in the first embodiment.

If E-mail is selected, the RGB uncompressed image in the photographic width is YCbCr-jpeg compressed since there is no need for adding white pixels and the resulting JPEG data is transmitted as an attachment file in the same manner as in the first embodiment. On this occasion, similarly to the first embodiment, the electronic mail is transmitted with a file name added thereto, which is set to a file name corresponding to the subject if it is set such that a file name corresponding to the subject is to be added; a file name "color image N" (N: the number of page if the image data consists of a plurality of pages) if it is set such that a file name corresponding to the kind of an image is to be added; a predetermined fixed file name if it is set such that a file name corresponding to a predetermined fixed file name is to be added; a file name selected from a plurality of file names registered in advance if it is set such that a file name corresponding to a registered file name is to be added; or a file name inputted by the user at the time of transmission of the electronic mail if it is set such that a user-inputted file name is to be added.

There will now be described the operation in the case where a color image in the A4 width is scanned as in the above item 2). During the scan, RGB image data obtained by shading correction is converted into YCbCr uncompressed image data via the γ converting section B 249 and the RGB/YCbCr converting section 251 and is then compressed into YcbCr-jpeg image data by the JPEG compressing and expanding section 250 to be stored in the RAM 242 as is distinct from the first embodiment.

If the hand scanner 102 is mounted in the facsimile apparatus 101 (body) in this state, the messages [Copy FAX E-mail] are indicated in the display section of the operation panel 213 of the facsimile apparatus 101 (body) similarly to the first embodiment. However, even if the user selects FAX or E-mail, a warning is displayed to inhibit the transmission by facsimile or electronic mail. If the user selects Copy, the YCbCr-jpeg data stored in the RAM 242 is expanded once into RGB uncompressed image data by the JPEG compressing and expanding section 250, and the resolution thereof is converted into a resolution suitable for printing by the resolution converting section 252. The image data is then converted into binary data by the binary-coding section 255, and the resulting data is sent to a printer of the facsimile apparatus 101 (body) so that it can be printed out.

It goes without saying that image data may be transmitted in the case where a color image in the A4 width is scanned by the hand scanner 102. In such a case, the file name that is added to the electronic mail to be transmitted is determined in the manner as described above.

Variation of the First and Second Embodiments

Although in the first and second embodiments it is assumed that an image is transmitted by facsimile or electronic mail through the ISDN, it may be considered that an image is transmitted to an in-house or neighborhood computer through a radio communication medium such as Bluetooth, IrDA (Infrared Data Association) and PHS (Personal Handy-phone System) or a wire communication medium such as USB (Universal Serial Bus) and IEEE (Institute of Electrical and Electronics Engineers) 1394.

Figure 9:
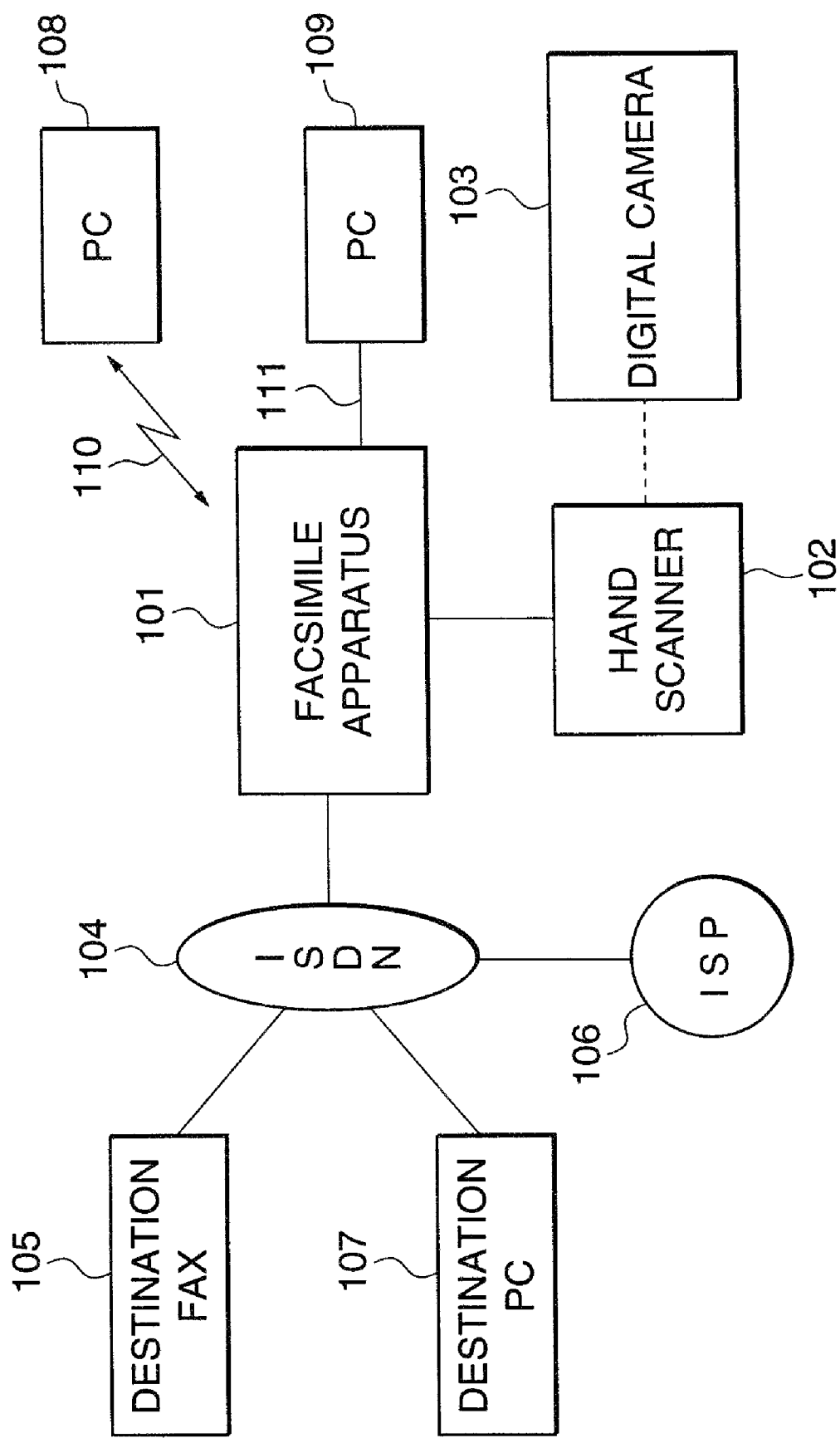
FIG. 9 is a block diagram showing the arrangement of a communication system incorporating a data communication apparatus according to a variation of the first and second embodiments of the present invention.

FIG. 9 is a schematic block diagram showing the arrangement of a communication system according to a variation of the first and second embodiments of the present invention. The communication system according to the variation of the first and second embodiments is comprised of a facsimile apparatus 101, a hand scanner 102, a digital camera 103, a communication network 104 such as ISDN, a facsimile apparatus (FAX) 105 at a destination, an internet service provider (ISP) 106, a computer (PC) 107 at a destination, and computers (PC) 108, 109 placed in the same house as the facsimile apparatus 101.

The arrangement of essential parts of the present communication system will now be described in detail. The computer (PC) 108 communicates with the facsimile apparatus 101 through a radio communication network 110, such as Bluetooth, IrDA or PHS. The computer (PC) 109 communicates with the facsimile apparatus 101 through a radio communication network 111, such as USB (Universal Serial Bus) or IEEE 1394. Otherwise, the present communication system is constructed in the same manner as those of the first and second embodiments. It should be noted that image data for use in the communication of the present communication system is produced by JPEG compressing image data of the YCbCr color space as is the case with the image transmission by electronic mail.

This variation is different from the image transmission by electronic mail in the first and second embodiments in that, in response to an instruction for starting the transmission, a signal is not transmitted to the ISDN line but a communication link is established according to a communication protocol of a communication medium used for communication. By transmitting JPEG data on the established communication line, it is possible to see an image on the computers 108, 109, etc. having a JPEG expanding function.

Other Embodiments

In the first and second embodiments described above, the processing mode is selected according to such a message as "Print? FAX transmission? E-mail transmission?". That is, the image transmission mode is selected in addition to the processing mode. Thus, such dedicated keys as a "FAX key" and an "electronic mail button" may be provided on the operation panel 213.

On the other hand, in the transmission of an image, the transmission mode is automatically determined by determining whether a selected abbreviated number corresponds to a telephone number of the facsimile apparatus 101 or an electronic mail address. If such determination is made, the message can be shortened to "Print? Transmission?". If the selected abbreviated number (telephone directory) corresponds to a telephone number of the facsimile apparatus 101, a character "F" is indicated at the side of the name. If the selected abbreviated number corresponds to an electronic mail address, a character "E" is indicated at the side of the name. This makes it easier to identify a user of the facsimile apparatus 101.

In the first and second embodiments described above, assuming that ISDN is applied as a public network, the analog signal modulated by the modem is converted into the PCM code in the case of facsimile transmission and the data assembled into the HDLC frame is directly transmitted to the ISDN in the case of electronic mail transmission. The public network, however, may also be an analog line (PSTN: Public Switched Telephone Network). If the analog line is used for facsimile transmission, the analog signal modulated by the modem is directly transmitted to the analog line. In the case of electronic mail transmission, an analog signal modulated according to the electronic mail data by the modem is transmitted to the analog line.

It is also possible to use a variety of other communication lines, e.g. LAN (Local Area Network) such as Ethernet.

In the above described first and second embodiments, the color space converting section is accommodated in the hand scanner 102, but it may be accommodated in the facsimile apparatus 101. Moreover, the same effects can be achieved irrespective of whether the color space converting process and the JPEG compressing and expanding process are carried out by hardware or software.

Although in the above described first and second embodiments, it is assumed that the hand scanner 102 is detached from the facsimile apparatus 101 to read an image, but this not limitative, but the same effects can be achieved irrespective of whether or not the hand scanner 102 is mounted in the facsimile apparatus 101 and whether or not the hand scanner is detachable from the facsimile apparatus 101.

Further, although in the above described first and second embodiments, the JPEG compression method using DCT is used for coding, other compression methods such as a color compression method using wavelet transformation may be used for coding. Moreover, the color space of the image data before DCT should not necessarily be Lab or YCbCr, but other color spaces may be used.

Further, in the above described first and second embodiments, a subject is directly used as the name of an attached file, an arbitrary character string may be used without using a subject.

Further, although the above descriptions of the first and second embodiments and the variation thereof are based on examples of arrangements shown in FIGS. 1 and 9, it should be understood that there is no intention to limit the number of facsimile apparatuses, hand scanners, digital cameras, computers, etc.

Further, although the above embodiments and variation are based on an example of the facsimile apparatus having the electronic mail transmitting function, the same effects can be achieved by using a personal computer in which, for example, an application for producing and transmitting E-mail data is installed. In such a case, the attached file is not limited to an image file but may be other files. Also, an application for only producing E-mail data may be installed. In such a case, electronic mail data with an attached file produced as in the above described embodiments is transferred to an application for electronic mail transmission so that it can be transmitted by electronic mail.

As described above, the present invention may be applied to various kinds of systems, such as a system comprised of multiple equipment (e.g. a host computer, interface equipment, a reader, and a printer), and a system comprised of one equipment (e.g. a host computer, interface equipment, a reader, and a printer).

It goes without saying that the present invention may be accomplished by installing program code of software realizing the functions of any of the above described embodiments and variation in a medium such as a storage medium (or a recording medium) of the system or the apparatus, and causing a computer (or CPU or MPU) of the system or the apparatus to read out and execute the program code read out from a medium such as the storage medium (or the recording medium).

In this case, the program code itself which is read out from a medium such as the storage medium (or the recording medium) realizes the functions of any of the above described embodiments and variation, and the medium such as the storage medium (or the recording medium) storing the program code constitutes the present invention. The storage medium (or the recording medium) for recording the program code may be a floppy disk, a hard disk, an optical memory disk, an magneto-optical disk, a CD-ROM, a CD-R (CD-Recordable), a magnetic tape, a nonvolatile memory card, a ROM, a network storage, for instance.

Further, it goes without saying that the present invention encompasses a case in which the functions of any of the above described embodiments and variation are accomplished not only by executing the program code read out by the computer, but also by causing an operating system (OS) operating on the computer to perform a part or all of actual operations according to the instructions of the program code.

Further, it goes without saying that the present invention encompasses a case in which the program code read out from the storage medium (or the recording medium) is written into a memory provided in an expanded function board inserted into the computer or in an expanded function unit connected to the computer, and then the CPU or the like integrated in the expanded function board or the expanded function unit performs a part or all of actual operations according to the instructions of the program code so as to accomplish the functions of any of the above described embodiments and variation.

If the present invention is applied to the above-mentioned storage medium, the storage medium stores program code corresponding to the flow charts explained above.

Figure 11:
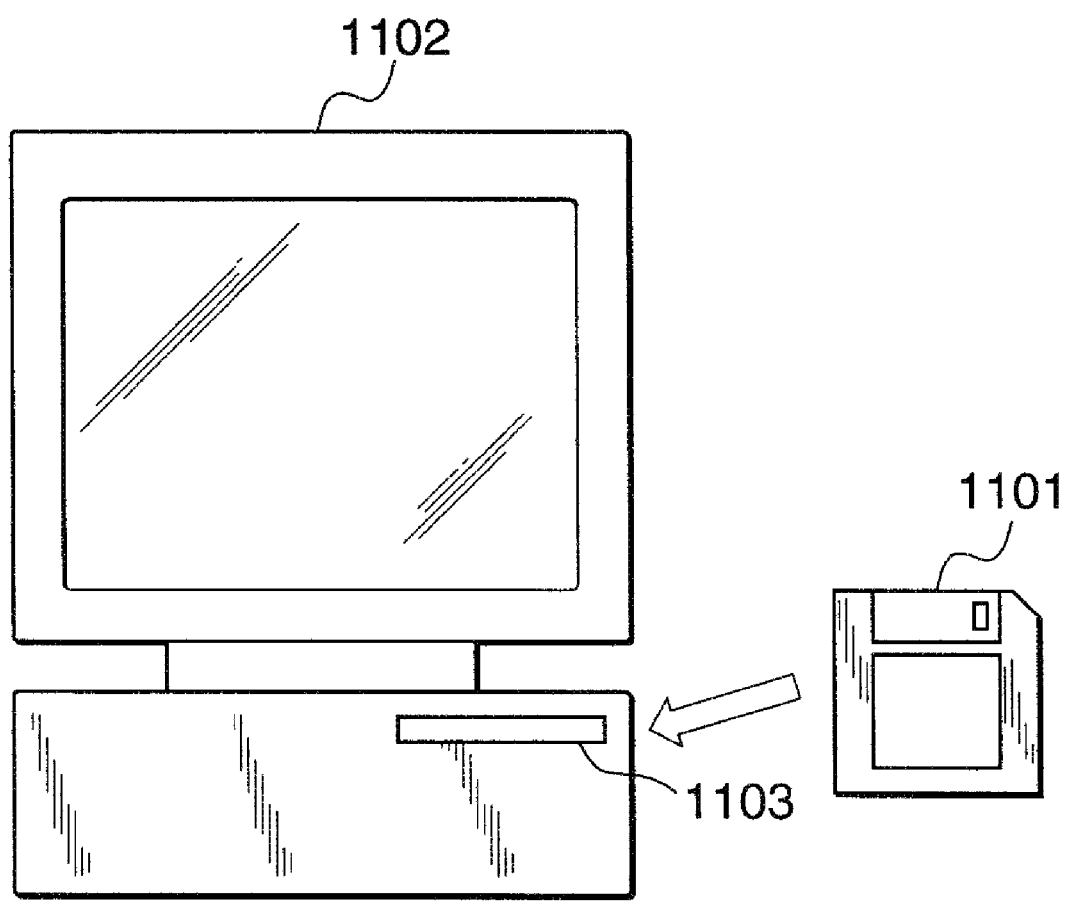
FIG. 11 is a view useful in conceptually explaining an example in which a program and related data for executing the electronic mail data producing method according to the present invention are supplied from a storage medium to an apparatus such as a computer.

FIG. 11 is a view useful in conceptually explaining a state in which a program and related data for executing the electronic mail data producing method according to the present invention are supplied from the storage medium to an apparatus such as a computer. The program and related data for executing the electronic mail data producing method according to the present invention are supplied by inserting a storage medium such as a floppy disk and a CD-ROM into an insertion opening 1103 of a storage medium drive integrated in an apparatus 1102 such as a computer. Then, the program and related data for executing the electronic mail data producing method according to the present invention are temporarily installed in a hard disk and loaded from the hard disk into a RAM, or are directly loaded into the RAM without being installed in the hard disk so as to execute the program and related data.

In this case, if the program and related data for executing the electronic mail data producing method according to the present invention are executed in the facsimile apparatus according to the first and second embodiments of the present invention and the variation, the program and related data are supplied to the facsimile apparatus through the apparatus such as a computer as described above with reference to FIG. 11 or the program and related data are preinstalled in the facsimile apparatus so as to execute the program.

Figure 10:
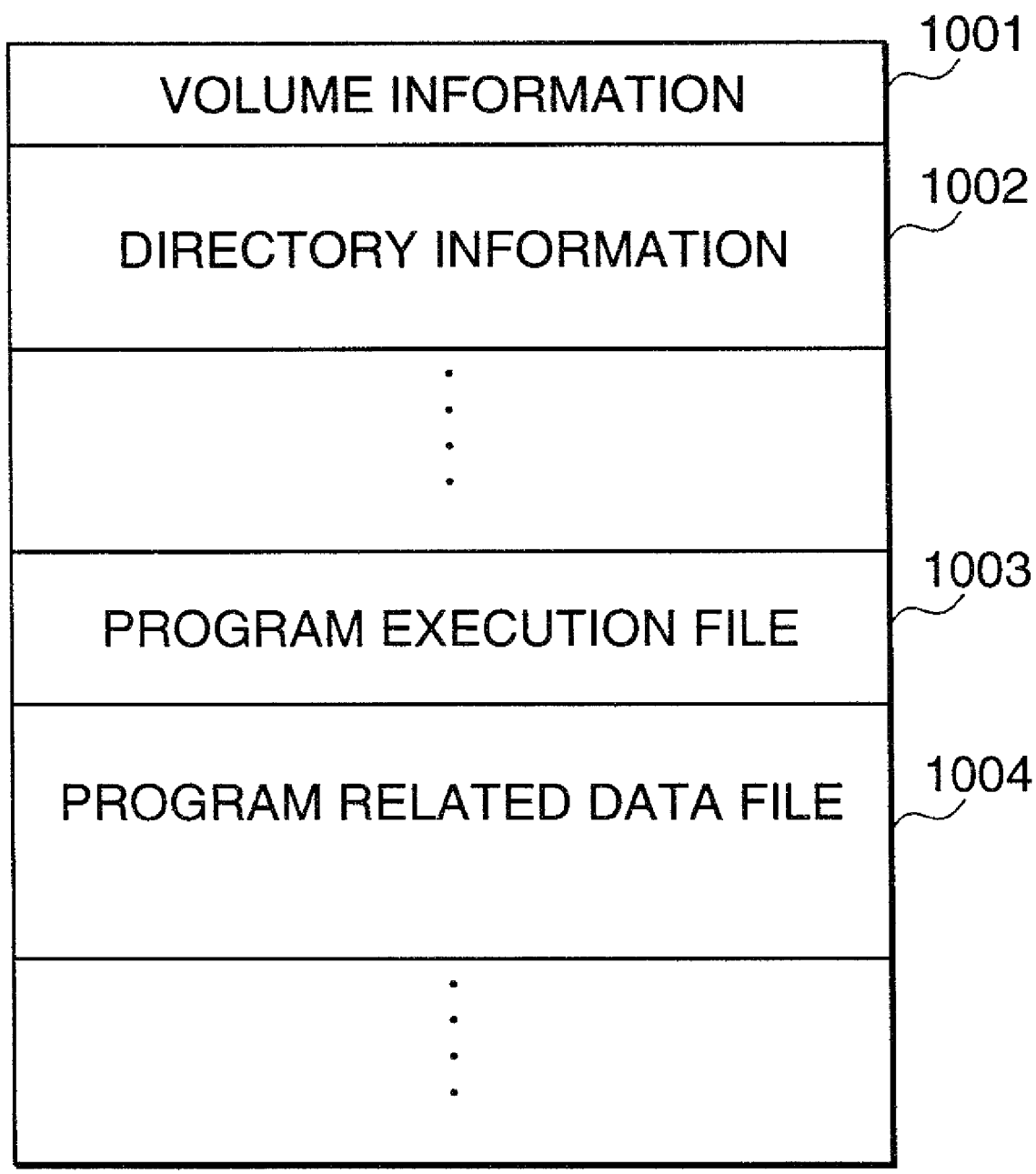
FIG. 10 is a view useful in explaining an example of the structure of data stored in a storage medium storing a program and related data for executing an electronic mail data producing method according to the present invention.

FIG. 10 is a view useful in explaining the arrangement of the contents of the storage medium storing the program and related data for executing the electronic mail data producing method according to the present invention. The contents of the storage medium are comprised of volume information 1001, directory information 1002, a program execution file 10003, a program related data file 1004, and the like. The program executing the electronic mail data producing method according to the present invention is converted into program code according to the flow charts described above.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A data communication apparatus in which a detachable storage medium is to be mounted, comprising:

a recognizing unit arranged to recognize that the detachable storage medium is mounted in the apparatus;

a displaying unit arranged to display a plurality of functions which can be executed by the apparatus, when the recognizing unit recognizes that the detachable storage medium is mounted in the apparatus;

a function selecting unit arranged to select any one of a plurality of the functions which can be executed by the apparatus;

an executing unit arranged to execute the any one of the plurality of the functions selected by said function selecting unit; and an image data selecting unit arranged to select one image data for which the any one of the plurality of the functions selected by said function selecting unit is to be executed, out of the at least one image data stored in the detachable storage medium, wherein said image data selecting unit selects, in a case where the detachable storage medium stores a command file which describes a manner of processing the image data stored in the detachable storage medium, the image data designated by the command file, and selects, in a case where the detachable storage medium does not store the command file, the image data designated by an ID of the image data specified by a user, and wherein said executing unit executes the any one of the functions selected by said function selecting unit for the one image data selected said data selecting unit.

2. A data communication apparatus according to claim 1, wherein a plurality of the functions which can be executed by the apparatus include at least one of a printing function of executing printing based on the image data stored in the detachable storage medium, a facsimile-transmitting function of facsimile-transmitting the image data stored in the detachable storage medium, and an electronic mail-transmitting function of electronic mail-transmitting the image data stored in the detachable storage medium.

3. A data communication method comprising the steps of:
recognizing that a detachable storage medium is mounted in a data communication apparatus with a recognizing unit;

displaying a plurality of functions which can be executed by the data communication apparatus, when the recognizing unit recognizes that the detachable storage medium is mounted in the data communication apparatus;

selecting any one of a plurality of the functions which can be executed by the data communication apparatus with a function selecting unit;

selecting one image data for which the any one of the plurality of the functions selected by said function selecting unit is to be executed with an image data selecting unit, out of the at least one image data stored in the detachable storage medium, wherein said image data selecting unit selects, in a case where the detachable storage medium stores a command file which describes a manner of processing the image data stored in the detachable storage medium, the image data designated by the command file, and selects, in a case where the detachable storage medium does not store the command file, the image data designated by an ID of the image data specified by a user, and executing the any one of the plurality of the functions selected in said selecting step.

4. A non-transitory computer-readable storage medium storing a program for causing a computer to execute a data communication method, the method including:

recognizing that a detachable storage medium is mounted in a data communication apparatus with a recognizing unit;

displaying a plurality of functions which can be executed by the data communication apparatus, when the recognizing unit recognizes that the detachable storage medium is mounted in the data communication apparatus;

selecting any one of a plurality of the functions which can be executed by the data communication apparatus with a function selecting unit;

selecting one image data for which the any one of the plurality of the functions selected by said function selecting unit is to be executed with an image data selecting unit, out of the at least one image data stored in the detachable storage medium, wherein said image data selecting unit selects, in a case where the detachable storage medium stores a command file which describes a manner of processing the image data stored in the detachable storage medium, the image data designated by the command file, and selects, in a case where the detachable storage medium does not store the command file, the image data designated by an ID of the image data specified by a user, and executing the any one of the plurality of the functions selected in said selecting step.

* * * * *